United States Patent
Hirano et al.

(10) Patent No.: US 8,687,960 B2
(45) Date of Patent: Apr. 1, 2014

(54) COMMUNICATION METHOD, OPTICAL COMMUNICATION SYSTEM, STATION-SIDE OPTICAL-LINE TERMINAL APPARATUS, AND USER-SIDE OPTICAL-LINE TERMINAL APPARATUS

(75) Inventors: Yukio Hirano, Tokyo (JP); Hiroaki Mukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/395,145

(22) PCT Filed: Mar. 24, 2010

(86) PCT No.: PCT/JP2010/002054
§ 371 (c)(1),
(2), (4) Date: Mar. 9, 2012

(87) PCT Pub. No.: WO2011/117917
PCT Pub. Date: Sep. 29, 2011

(65) Prior Publication Data
US 2012/0177361 A1 Jul. 12, 2012

(51) Int. Cl.
*H04B 10/20* (2011.01)
(52) U.S. Cl.
USPC .................................. 398/58; 398/86; 398/88
(58) Field of Classification Search
USPC .................. 398/33–38, 58, 66–72, 82–88
See application file for complete search history.

(56) References Cited

U.S. PATENT DOCUMENTS

| 8,275,261 | B2 * | 9/2012 | Mandin et al. | 398/72 |
| 2006/0029389 | A1 * | 2/2006 | Cleary et al. | 398/33 |
| 2008/0212964 | A1 * | 9/2008 | Gao et al. | 398/58 |
| 2009/0263127 | A1 * | 10/2009 | Haran et al. | 398/38 |
| 2010/0260497 | A1 * | 10/2010 | Yoon et al. | 398/38 |

FOREIGN PATENT DOCUMENTS

| JP | 2005 151150 | 6/2005 |
| JP | 2007 274534 | 10/2007 |
| JP | 2008 244583 | 10/2008 |
| JP | 2009-171424 | 7/2009 |
| JP | 2009 260970 | 11/2009 |

OTHER PUBLICATIONS

Haran, O., et al., "ONU power-save annex," PMC-Sierra Inc., pp. 1-10, (Apr. 2008).

(Continued)

*Primary Examiner* — Dzung Tran
(74) *Attorney, Agent, or Firm* — Oblon, Spivak, McClelland, Maier & Neustadt, L.L.P.

(57) ABSTRACT

A communication method of an optical communication system in which a plurality of ONUs are connected to an OLT, includes steps (a) allocating, by the OLT, a transmission bandwidth to an ONU capable of an operation in a sleep mode in which an optical transmitter is tentatively halted for a predetermined sleep period, and transmitting a transmission bandwidth notification to the ONU when the ONU is in the sleep mode and when the ONU is not in the sleep mode; (b) receiving, from the ONU to which the transmission bandwidth is allocated, a response signal when the ONU is not in the sleep mode, wherein the response signal is or is not received during the sleep mode; and (c) suppressing, by the OLT, an alarm in the sleep mode, the alarm being caused by a communication failure with the ONU on a basis of the response signal not being received.

26 Claims, 14 Drawing Sheets

(56) References Cited

OTHER PUBLICATIONS

International Search Report Issued May 11, 2010 in PCT/JP10/02054 Filed Mar. 24, 2010.
U.S. Appl. No. 13/698,509, filed Nov. 16, 2012, Mukai, et al.
Office Action mailed Aug. 6, 2013, in Japanese Patent Application No. 2012-220548 (with English-language translation).
Extended European Search Report mailed Oct. 31, 2013, in European Patent Application No. 10848313.2.
ITU-T, "Gigabit-capable Passive Optical networks (G-PON): Transmission Convergence layer specification," Amendment 1, G.984.3, Feb. 2009.
Editors G.984.3, "White Paper: Means and impact of GPON power conservation," ITU-T Draft, Dec. 2008.

* cited by examiner

COMMUNICATION METHOD, OPTICAL COMMUNICATION SYSTEM, STATION-SIDE OPTICAL-LINE TERMINAL APPARATUS, AND USER-SIDE OPTICAL-LINE TERMINAL APPARATUS

FIELD

The present invention relates to a communication system in which a plurality of terminals is connected by a common line and a communication method, and, for example, relates to a PON (Passive Optical Network) system or the like that is composed of an OLT (Optical Line Terminal: station-side terminal apparatus) and a plurality of ONUs (Optical Network Unit: user-side terminal apparatus).

BACKGROUND

In the PON system, communication is performed while synchronizing between an OLT and ONUs so that data in an upstream direction to be transmitted from the ONUs does not collide. The OLT plans to give transmission permission to each ONU so that data in the upstream direction does not collide. At this time, delay due to a distance from each ONU is considered. Therefore, the OLT measures round trip time from each ONU, however, there is a variation of transmission paths, such as jitter and wander, in a transmission by optical fibers, so that measurement needs to be performed periodically.

On the other hand, data communication is not always performed, and, for example during nighttime, data communication is not performed at all. However, measurement of the round-trip time is periodically performed as above regardless of the presence or absence of data communication. Maintaining the ONU in a state capable of constant communication for measuring the round-trip time even when data communication is not performed results in wasting power. Therefore, a technology is studied in which the ONU is intermittently transitioned to a power-saving state by requesting transition to the power-saving state from the ONU.

Moreover, a PON system is studied in which when there is no upstream data from an ONU, useless transmission bandwidth is not allocated to such ONU to improve throughput (Patent Literature 1). In this PON system, when an OLT detects a state in which there is no user data for a preset given period, the OLT deregisters the ONU and notifies the ONU of temporary stop of an optical link. Thereafter, a transmission bandwidth is not allocated to the ONU and transmission of a frame for maintaining the link is also suppressed, so that the ONU can reduce the number of times of transmission of a frame.

CITATION LIST

Patent Literature

Patent Literature 1: Japanese Patent Application Laid-open No. 2007-274534

SUMMARY

Technical Problem

In the PON system described in Patent Literature 1, because a link is disconnected with respect to the ONU that does not transmit certain data, the load of the ONU can be reduced. However, when the ONU resumes transmission of upstream data, a discovery process of discovering an unconnected ONU is performed again and a link is newly established to re-register the ONU. Therefore, for example, when communication at a low bit rate continues, this communication method cannot be used. Moreover, because the OLT disconnects a link to an ONU, when communication abnormality occurs in the ONU or an upstream communication line itself, the abnormality cannot be detected. Furthermore, because the OLT deletes registration of the ONU, the ONU in a communication abnormal state is not discovered even by the discovery process and thus discovery of communication abnormality becomes difficult.

Solution to Problem

According to an aspect of the present invention, there is provided a communication method of an optical communication system in which a plurality of user-side optical-line terminals (ONUs) are connected to a station-side optical-line terminal (OLT) by using a common optical fiber, including the following steps (a) to (c): (a) allocating, by the OLT, a transmission bandwidth to an ONU, the ONU capable of an operation in a sleep mode in which an optical transmitter of the ONU is tentatively halted for a predetermined sleep period, and transmitting a transmission bandwidth notification to the ONU when the ONU is in the sleep mode and when the ONU is not in the sleep mode; (b) receiving, from the ONU to which the transmission bandwidth is allocated, a response signal when the ONU is not in the sleep mode, wherein the response signal is or is not received during the sleep mode; and (c) suppressing, by the OLT, an alarm in the sleep mode of the ONU, the alarm being caused by a communication failure with the ONU on a basis of the response signal not being received from the ONU.

According to another aspect of the present invention, there is provided an optical communication system in which a plurality of user-side optical-line terminals (ONUs) are connected to a station-side optical-line terminal (OLT) by using a common optical fiber, wherein the ONU includes an optical transceiver that is connected to the optical fiber, the ONU capable of an operation in a sleep mode in which a transmission unit of the ONU is tentatively stopped for a sleep period, and a control device that is configured to be capable of omitting transmission of a response signal to the OLT when a transmission bandwidth is allocated to the ONU by the OLT during the sleep mode, and the OLT includes an optical transceiver connected to the optical fiber, and a control device that detects an alarm for a communication failure with the ONU by allocating the transmission bandwidth to the ONU and monitoring the transmission bandwidth allocated to the ONU and suppresses the alarm to the ONU during a sleep mode of the ONU in which the transmission unit of the ONU is tentatively stopped.

According to still another aspect of the present invention, there is provided a user-side optical-line terminal apparatus of an optical communication system that connects a plurality of user-side optical-line terminal apparatuses to a station-side optical-line terminal apparatus by using a common optical fiber, in which the station-side optical-line terminal apparatus suppresses an alarm due to a communication failure with the user-side optical-line terminal apparatus on a basis of a response signal from the user-side optical-line terminal apparatus during a sleep mode of the user-side optical-line terminal apparatus, the user-side optical-line terminal apparatus including: an optical transceiver that is connected to the optical fiber and that is capable of an operation of a sleep mode in which power consumption is reduced by tentatively stopping a transmission unit for the sleep period; and a control device that is configured to be capable of omitting transmission of a response signal to the station-side optical-line terminal apparatus during the sleep mode when a transmission bandwidth is allocated by the station-side optical-line terminal apparatus during the sleep mode, to the user-side optical-line terminal apparatus.

According to still another aspect of the present invention, there is provided a station-side optical-line terminal apparatus of an optical communication system that connects a plurality of user-side optical-line terminal apparatuses to a station-side optical-line terminal apparatus by using a common optical fiber, including: an optical transceiver connected to the optical fiber; and a control device that detects an alarm for a communication failure with the user-side optical-line terminal apparatus by allocating a transmission bandwidth to the user-side optical-line terminal apparatus and monitoring the transmission bandwidth allocated to the user-side optical-line terminal apparatus in the sleep mode and suppresses the alarm to the user-side optical-line terminal apparatus in the sleep mode in which a transmission unit included in the user-side optical-line terminal apparatus is tentatively stopped.

According to still another aspect of the present invention, there is provided a control device of a user-side optical-line terminal apparatus of an optical communication system in which a common optical fiber connects a plurality of user-side optical-line terminal apparatuses to a station-side optical-line terminal apparatus, the station-side optical-line terminal apparatus suppressing an alarm in a sleep mode of the user-side optical-line terminal apparatus, the alarm being caused by a communication failure with the user-side optical-line terminal apparatus on a basis of a response signal from the user-side optical-line terminal apparatus, wherein the control device is capable of omitting transmission of a response signal to the station-side optical-line terminal apparatus during the sleep mode when a control signal is received from the station-side optical-line terminal apparatus via an optical transceiver during a sleep mode in which the optical transceiver connected to the optical fiber tentatively stops a transmission unit for the sleep period.

According to still another aspect of the present invention, there is provided a control device of a station-side optical-line terminal apparatus of an optical communication system in which a common optical fiber connects a plurality of user-side optical-line terminal apparatuses to a station-side optical-line terminal apparatus, wherein the control device allocates a transmission bandwidth to the user-side optical-line terminal apparatus and detects an alarm for a communication failure on a basis of a presence or absence of a response signal from the user-side optical-line terminal apparatus, and suppresses the alarm during a sleep mode in which the user-side optical-line terminal apparatus tentatively stops a transmission unit of the optical transceiver.

Advantageous Effects of Invention

The communication method, the optical communication system, the station-side optical-line terminal apparatus, and the user-side optical-line terminal apparatus according to the present invention can perform failure detection in a power-saving operation by an intermittent communication.

DESCRIPTION OF EMBODIMENTS

First Embodiment

Hardware Configuration

Figure 1:
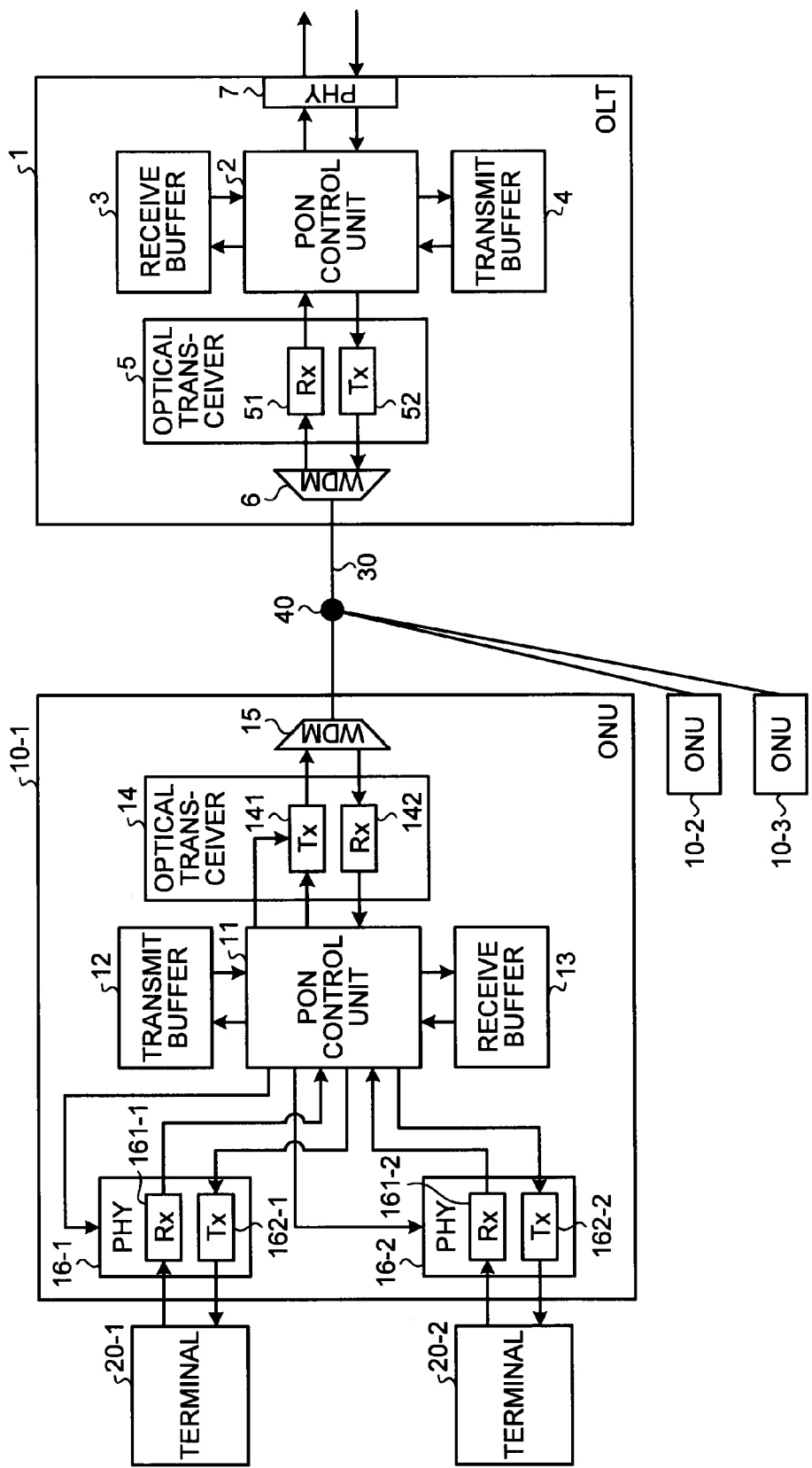
FIG. 1 is a configuration diagram illustrating a configuration of a communication system according to an embodiment of the present invention.

FIG. 1 is a diagram illustrating a configuration example of the first embodiment of a PON system according to the present invention. As shown in FIG. 1, the PON system in the present embodiment includes an OLT 1 and ONUs 10-1 to 10-3. The OLT 1 and the ONUs 10-1 to 10-3 are connected by a subscriber line 30 via a splitter 40. The splitter 40 splits the subscriber line 30 connected to the OLT 1 into the number of the ONUs 10-1 to 10-3. Moreover, the ONU 10-1 is connected to terminals 20-1 and 20-2. In the present embodiment, the number of the ONUs is three as an example, alternatively, the number of the ONUs is not limited thereto and can be any number.

The OLT 1 includes a PON control unit 2 that performs a process on the OLT side based on a PON protocol, a reception buffer 3 as a buffer that stores therein upstream data to be received from the ONUs 10-1 to 10-3, a transmission buffer 4 as a buffer that stores therein downstream data to be transmitted to the ONUs 10-1 to 10-3, an optical transceiver 5 that performs a transmission and reception process of an optical signal, a WDM (Wavelength Division Multiplexing) coupler (WDM) 6 that multiplexes wavelengths of upstream data and downstream data, and a physical-layer processing unit (PHY)

7 that realizes a physical interface function of an NNI (Network Node Interface) with the network. The optical transceiver 5 includes an optical receiver (Rx: Receiver) 51 that performs a reception process and an optical transmitter (Tx: Transmitter) 52 that performs a transmission process.

The ONU 10-1 includes a PON control unit 11 that performs a process on the ONU side based on the PON protocol, a transmission buffer (upstream buffer) 12 as a buffer that stores therein transmission data (upstream data) to the OLT 1, a reception buffer (downstream buffer) 13 as a buffer that stores therein reception data (downstream data) from the OLT 1, an optical transceiver 14, a WDM 15 that multiplexes wavelengths of upstream data and downstream data, and physical-layer processing units (PHYs) 16-1 and 16-2 that realize a physical interface function of an UNI (User Network Interface) with the terminals 20-1 and 20-2, respectively.

The optical transceiver 14 includes an optical transmitter (Tx: Transmitter) 141 that performs a transmission process and an optical receiver (Rx: Receiver) 142 that performs a reception process. The PHY 16-1 includes a receiving unit (Rx: Receiver) 161-1 that performs a reception process and a transmitting unit (Tx: Transmitter) 162-1 that performs a transmission process, and the PHY 16-2 includes a receiving unit (Rx: Receiver) 161-2 that performs a reception process and a transmitting unit (Tx: Transmitter) 162-2 that performs a transmission process.

Two terminals are connected to the ONU 10-1, however, the number of the terminals is not limited thereto and can be any number, and the physical-layer processing units (PHYs) are provided to correspond to the number of the terminals. Moreover, in FIG. 1, the configuration example of the ONU 10-1 is illustrated as representative, however, the ONUs 10-2 and 10-3 also have the same configuration as that of the ONU 10-1.

The PON control unit 2 of the OLT 1 performs a bandwidth allocation of upstream data to give transmission permission to each of the ONUs 10-1 to 10-3 so that transmission time periods do not overlap with each other thereby preventing collision of transmission data from the ONUs 10-1 to 10-3 in the same manner to the conventional PON system. Any method can be used for this bandwidth allocation, and, for example, it is possible to use a Dynamic Bandwidth Allocation Algorithm described in ""HuhDynamic Bandwidth Allocation Algorithm for Multimedia Services over Ethernet (registered trademark) PONs", ETRI Journal, Volume 24, Number 6, December 2002 p. 465 to p. 466 written by Su-il Choi and Jae-doo".

Next, the overall operation of the OLT 1 and the ONUs 10-1 to 10-3 in the present embodiment is explained. The PON control unit 2 stores downstream data (downstream communication data) received from the network via the PHY 7 in the transmission buffer 4. When transmitting data from the OLT 1, the PON control unit 2 reads out the downstream data stored in the transmission buffer 4 and outputs it to the optical transceiver 5, the Tx 52 of the optical transceiver 5 outputs the transmission data to the WDM 6 as an optical signal, and the WDM 6 performs wavelength multiplexing on the optical signal output from the optical transceiver 5 and outputs it to the ONUs 10-1 to 10-3 via the subscriber line 30 as a downstream signal. Moreover, when the PON control unit 2 transmits a control message such as a transmission bandwidth allocation that transmits an instruction of transmission permission, the PON control unit 2 outputs the generated control message to the optical transceiver 5 and thereafter the control message is transmitted to the ONUs 10-1 to 10-3 in the same manner to downstream data. In the PON system in FIG. 1, the WDMs 6 and 15 are used for performing wavelength multiplexing, however, in the case of communication at a single wavelength, the WDMs 6 and 15 are not necessary.

In the ONUs 10-1 to 10-3, when a downstream signal is received from the OLT 1, the WDM 15 separates the downstream signal to output it to the optical transceiver 14 and the Rx 142 of the optical transceiver 14 converts the downstream signal into downstream data of an electrical signal and outputs it to the PON control unit 11. The PON control unit 11 stores the downstream data output from the Rx 142 of the optical transceiver 14 in the reception buffer 13. The PON control unit 11 reads out the downstream data stored in the reception buffer 13 and outputs it to both or one of the PHYs 16-1 and 16-2 depending on the destination of the data. The PHYs 16-1 and 16-2 that received the downstream data performs a predetermined process on the downstream data and transmits it to the terminals 20-1 and 20-2 connected thereto.

On the other hand, when transmitting upstream data from the ONUs 10-1 to 10-3, the PON control unit 11 stores the upstream data obtained from the terminals 20-1 and 20-2 via the PHYs 16-1 and 16-2 in the transmission buffer 12. Then, the PON control unit 11 reads out the upstream data stored in the transmission buffer based on transmission bandwidth from the OLT 1 and outputs it to the optical transceiver 14. The Tx 141 of the optical transceiver 14 converts the upstream data into an optical signal (upstream signal) and transmits it to the OLT 1 via the WDM 15 and the subscriber line 30.

The PON control unit 2 of the OLT 1 stores the upstream data received from the ONUs 10-1 to 10-3 via the subscriber line 30, the WDM 6, and the Rx 51 of the optical transceiver 5 in the reception buffer 3. Moreover, the PON control unit 2 reads out the upstream data stored in the reception buffer 3 and outputs it to the network via the PHY 7.

Moreover, in the ONUs 10-1 to 10-3, for the control message from the OLT 1, the PON control unit 11 receives the control message via the WDM 15 and the Rx 142 of the optical transceiver 14 and performs an operation based on the instruction of the control message, generation of a response to the control message, and the like.

Power-Saving Operation

Next, the power-saving operation of the PON system is explained with reference to FIG. 2 as an example of a power-saving operation of a communication system.

(d1)-(d2) & (u1)-(u2) Communication in Normal Operation State

Figure 2:
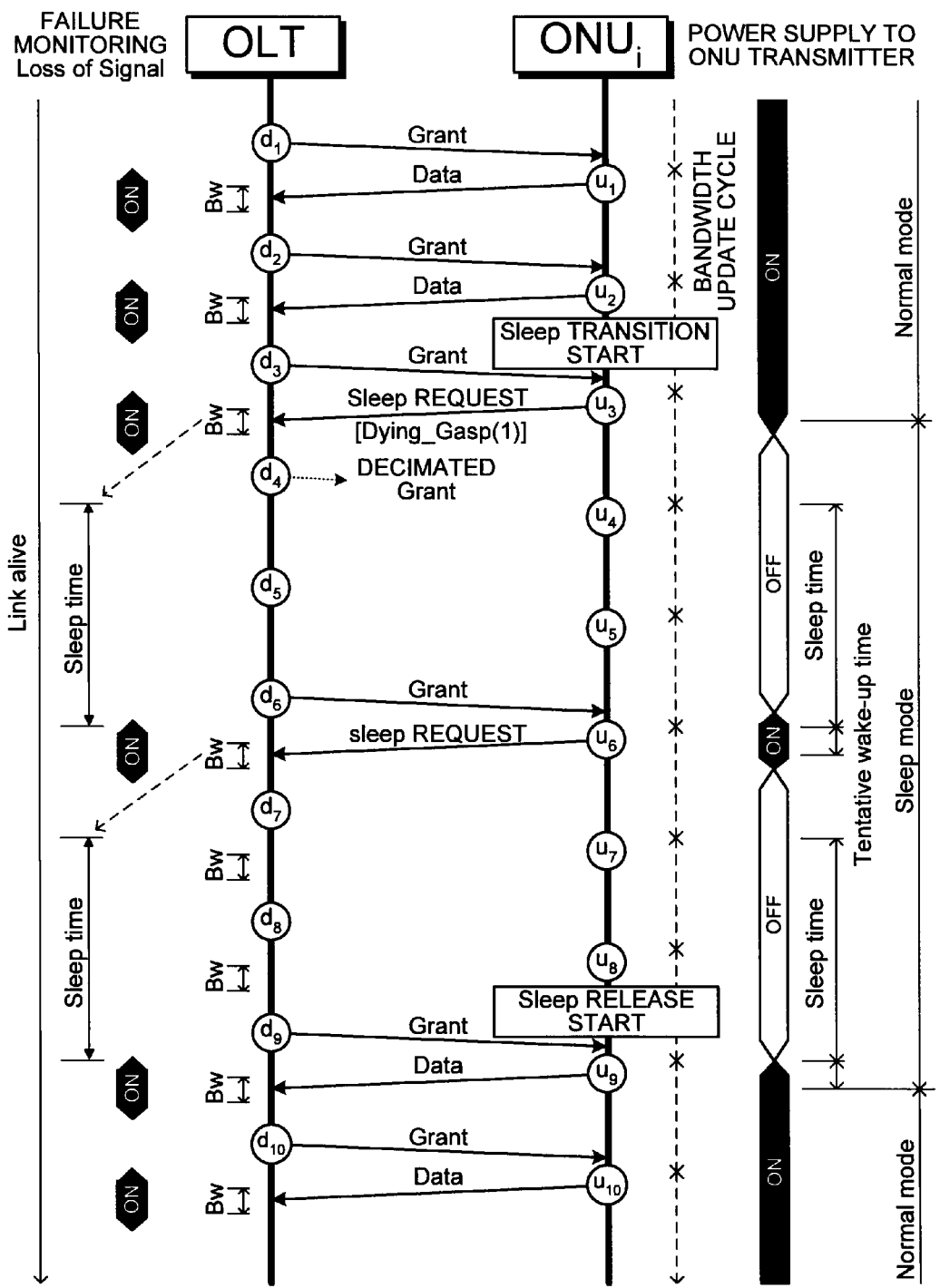
FIG. 2 is a sequence diagram illustrating a communication method according to a first embodiment of the present invention.

FIG. 2 illustrates a sequence after a process such as the discovery is finished and communication in a normal communication state (Normal mode) is started. FIG. 2 illustrates only one ONU 10, however, in practice, the OLT 1 communicates with a plurality of the ONUs 10 by the similar method. In the PON system, in an upstream communication (uplink), a transmission bandwidth is allocated to a plurality of the ONUs 10 by time-division multiplexing communication. The OLT 1 transmits a grant signal (Grant), which specifies a transmission bandwidth Bw and grants communication, to the ONU 10 for controlling this time-division multiplexing. The transmission bandwidth can also be referred to as a transmission time, so that, in other words, the OLT 1 allocates the transmission time to the ONU 10 and transmits the grant signal to the ONU 10. The Grant includes information from which each ONU 10 can be identified, a communication start time, and a communication end time (or communication duration).

The ONU 10 transmits upstream data (Data) in a specified bandwidth specified by this Grant. The OLT 1 receives the upstream data in the transmission bandwidth Bw, and performs data relay to an upper-level device that is present on a core network side and also detects a communication failure with the ONU 10. When the upstream data is not transmitted in the specified transmission bandwidth Bw, the OLT 1 determines that abnormality occurs in the ONU 10 corresponding to this transmission bandwidth. This communication failure monitoring is described later.

(d3)-(d8) & (u3)-(u8) Communication in Power-Saving State

When the ONU 10 becomes possible to communicate in the power-saving state or needs communication in the power-saving state, the ONU 10 notifies the OLT 1 of transition to the power-saving state. Any request signal can be used for this notification, and, for example, a Dying_Gasp signal is transmitted.

When this notification is received, the OLT 1 detects that the ONU 10 enters into the power-saving state and pauses bandwidth allocation to the ONU 10 for a predetermined period (sleep time). In this communication method, any value can be set as the sleep time, however, it is difficult to maintain a normal link for a long period such as one hour basis, so that, for example, a short period such as millisecond is specified.

When the ONU 10 transitions to the power-saving state, the ONU 10 turns off the laser power of the Tx 141 of the optical transceiver 14 to control to an off-state. At this time, the ONU 10 does not perform power cut of the Rx 142 of the optical transceiver 14 and continues reception of a control signal and downstream data from the OLT 1. On the other hand, the OLT 1 also does not transmit the Grant to the ONU 10 transitioned to the power-saving state, however, transmits other control signal and downstream data. In FIG. 2, the power-supply state of the Tx 141 of the ONU 10 is indicated by "ON" and "OFF" on the right side of the ONU sequence. In the power-saving state, i.e., the sleep mode, on and off of the power are intermittently repeated for this period. The period indicated by "OFF" is a stop period during which the laser power of the Tx 141 is stopped. Between intermittent stop periods, the ONU 10 wakes up the Tx 141 to generate a tentative wake-up time (Tentative wake-up time). The "Sleep time" is a predetermined time length and, in this example, specifies absolute time of the stop period based on the start time of a bandwidth update cycle. In FIG. 2, the "Sleep time" and the "OFF" period do not match. This is because the ONU 10 that transmitted upstream data cuts power supply without waiting for the next bandwidth update cycle. Other embodiments are not limited to this example and, it is applicable to cause the "Sleep time" and the "OFF" period to match.

The OLT 1 measures the sleep time for each ONU 10 and transmits the Grant to the ONU 10 after elapse of the sleep time (d6). This Grant is transmitted to tentatively wake up the ONU 10 in the power-saving state. When the ONU 10 receives the Grant from the OLT 1 in this tentative wake-up time, the ONU 10 tentatively supplies laser power to the Tx 141 of the optical transceiver 14 even during operation in the power-saving state to cause the Tx 141 to be in an on-state. Because the end time of the sleep time is known, the ONU 10 can cause the power to be in an on-state without waiting for notification of a bandwidth allocation from the OLT 1. When the ONU 10 maintains the power-saving state, the ONU 10 retransmits the sleep request as explained in the above (u3) and turns off the laser power of the Tx 141 of the optical transceiver 14 to transition to the power-saving state (u6).

The OLT 1 monitors the bandwidth allocated to the ONU 10 in the power-saving state and detects whether the request signal is normally transmitted. At this time, when the signal is not normally transmitted from the ONU 10 in the power-saving state, the OLT 1 determines that a failure occurs in a communication path of an uplink or the ONU 10 itself and issues an alarm. This operation at the time of occurrence of a failure is described later with reference to FIG. 5.

(d9)-(d10) & (u9)-(u10) Communication at the Time Power-Saving Release

In the ONU 10, when release of the power-saving state is needed, such as in a case where transmission of a large amount of data is needed, the ONU 10 requests release of the power-saving state in the tentative wake-up time after the sleep time. This release of the power-saving state can be performed by the ONU 10 transmitting a specific signal, however, can be realized, for example, by transmitting valid upstream data in a specified bandwidth. The power-saving state is released by transmitting valid upstream data, so that a bandwidth of transmission data in which transmission bits are saved can be effectively used.

The OLT 1 monitors the bandwidth allocated to the ONU 10 in the power-saving state after the timing (d9) and performs failure detection in the similar manner to the operation after the above (d6). At the same time, when the ONU 10 transmits a power-saving request, the OLT 1 maintains an operation in the power-saving state with respect to the ONU 10, however, when a release request of the power-saving state is received as above, an operation in the power-saving state is released and an operation for normal operation is started with respect to the ONU 10.

According to the above operation, the OLT 1 can allow a power-saving operation by the ONU 10 while maintaining a link to the ONU 10, and at the same time, can detect occurrence of a failure at an early stage even if a failure occurs in a communication with the ONU 10 that normally does not transmit data. Furthermore, the ONU 10 can suppress power consumption by stopping supply of laser power to the Tx 141 of the optical transceiver 14, and, even in a communication necessary for failure monitoring, the ONU 10 can suppress power consumption by decimated Grant compared with the case where transmission of any signal is forced every bandwidth update cycle.

A transmission bandwidth allocation cycle is a cycle in which the OLT 1 notifies of allocation of a transmission bandwidth and allocates the transmission bandwidth to the ONU 10. The above decimated Grant is the Grant, which has an allocation interval of a transmission bandwidth longer than the time when the ONU 10 is operated in a normal state, in the ONU 10 in the power-saving state.

The transmission bandwidth allocation cycle allocated to the ONU 10 in the power-saving state can be determined by any method, and, as an example, the transmission bandwidth allocation cycle can be set to have a value matching a detection time T of an MPCP (Multi-Point Control Protocol) timeout alarm. If the transmission bandwidth allocation cycle is set longer than the time of the MPCP timeout, the ONU 10 in the sleep mode lasts into this MPCP timeout, so that the OLT 1 sets the transmission bandwidth allocation cycle to the time equal to or less than the MPCP timeout. Moreover, if a transmission period is provided to the ONU 10 a plurality of times (n times) but cannot be received even once and this is determined as the MPCP timeout, unnecessary alarm and the like can be suppressed. Therefore, for example, when the MPCP timeout is set to T milliseconds, the OLT 1 sets the transmission bandwidth allocation cycle to T/n milliseconds.

Moreover, because the link between the OLT 1 and the ONU 10 is maintained, power consumption can be reduced even while user terminals continue communication with each other.

Details of Communication Control of OLT

Next, details of the communication process of the OLT 1 are explained with reference to FIG. 3.

Figure 3:
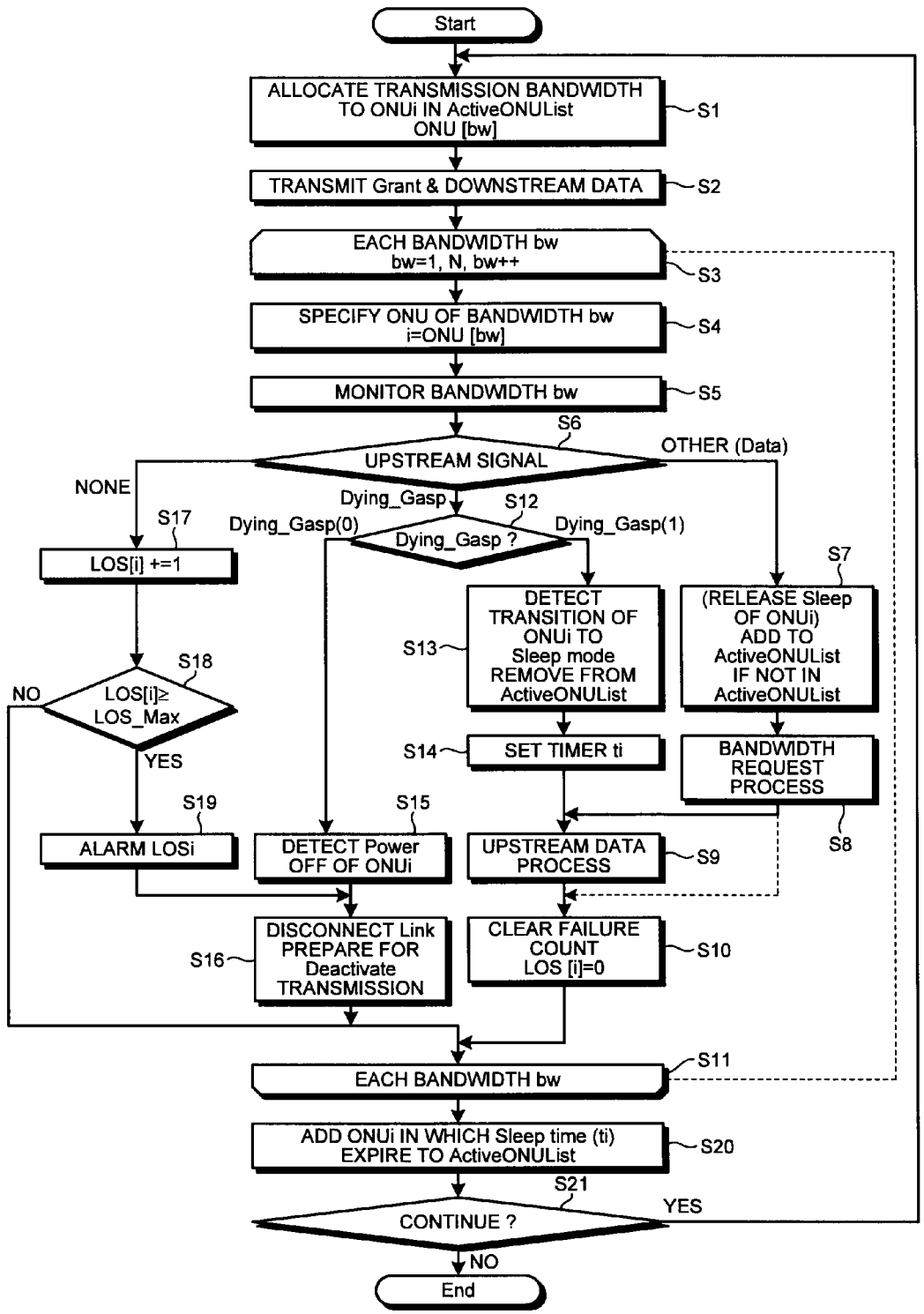
FIG. 3 is a flowchart illustrating a communication control of an OLT according to the first embodiment of the present invention.

FIG. 3 illustrates the process of the PON control unit 2 (PON controller) of the OLT 1. First, the PON control unit 2 specifies the ONUs 10 to which a transmission bandwidth of an uplink needs to be allocated based on a list (ActiveONUList) of the ONUs 10, which are discovered by the discovery and to which a link is provided, and allocates a transmission bandwidth to each ONU 10 (Step S1). At this time, for example, when a transmission bandwidth for one cycle is divided into N, an identifier ID of a corresponding ONU 10 is given as $id_{bw}$=ONU[bw], bw=1, 2, ..., N.

In the ActiveONUList, the ONU 10 in the power-saving state is excluded, so that the PON control unit 2 can perform a dynamic bandwidth allocation so that a transmission bandwidth is not allocated to the ONU 10 in the power-saving operation by referring to this list.

Next, the PON control unit 2 collects the Grant and downstream data in a frame and controls the optical transceiver 5 to transmit this frame to the ONU 10 (Step S2). The Grant and the downstream data can be transmitted with the same frame or can be transmitted with different frames.

Next, the PON control unit 2 performs a reception process of each transmission bandwidth received by the Rx 51 by the following steps (Step S3).

First, the PON control unit 2 specifies the ONU 10 allocated to the next transmission bandwidth (Step S4). At this time, the Rx 51 of the optical transceiver 5 performs reception of an uplink concurrently, and the PON control unit 2 reads data received by the Rx 51 into a built-in memory or the like for processing (Step S5). The PON control unit 2 checks the type of the received upstream signal (Step S6), and when there is no valid signal, the process proceeds to Step S17, when the request signal (Dying_gasp) for the power-saving state is detected, the process proceeds to Step S12, and when the signal is other data signals or the like, the process at Step S7 is performed.

At Step S7, the PON control unit 2 checks the ONU 10 of the transmission source of the received data, and when this ONU 10 is not included in the ActiveONUList, the PON control unit 2 adds the ONU 10 to the ActiveONUList. The OLT 1 detects that the ONU 10 releases the power-saving state by the ONU 10 in the power-saving state transmitting normal data.

The received data includes a bandwidth request from the ONU 10, and the PON control unit 2 reads the bandwidth request from the received frame, and associates it with the identifier (ID) of the ONU 10 for the next bandwidth allocation at Step S1 and records this bandwidth request in a memory (Step S8). The bandwidth request is expressed by a stored amount of data (occupancy) in the transmit buffer 12 of the ONU 10 or the like. The method in which the ONU 10 transmits a report on the occupancy of the transmit buffer 12 and the OLT 1 performs the dynamic bandwidth allocation based on this report is called an SR-DBA (status reporting DBA). The bandwidth request does not need to be performed explicitly, and it is possible that the OLT 1 adjusts a bandwidth to be allocated with respect to a bandwidth allocated to the ONU 10 by monitoring a data amount actually transmitted by the ONU 10. This is called a TM-DBA (traffic-monitoring DBA). At Step S8, traffic monitoring by this TM-DBA can be performed.

Next, the PON control unit 2 transmits the received data stored in the receive buffer 3 to the network via the PHY 7 (Step S9).

The PON control unit 2 always monitors a communication state of an uplink to each ONU 10. If an expected frame cannot be received at the timing at which the ONU 10 transmits a frame, an alarm signal called a LOSi (Loss of signal for ONUi) is output. This alarm signal is an alarm necessary for network management, and, when the LOSi is generated, this is notified to a network operator and the network operator performs measures against failure based on this LOSi. Step S10 is a process of clearing a failure count for this LOSi. The LOSi is a signal that is output when a signal cannot be received, for example, four times continuously from an i-th ONU 10 and a true failure is determined, and the failure count is a variable that counts the number of continuous times of this non-receipt. The PON control unit 2 performs count-up of the count of the LOSi at Step S17 described later.

When the process at Step S10 is finished, the PON control unit 2 returns to the top of the loop process at Step S3 for processing the next bandwidth. This loop process is a process of repeating the process for the bw-th bandwidth from 1-th to N-th.

Next, the process in the case where the OLT 1 receives the sleep request (Dying_Gasp) at Step S6 is explained.

In this embodiment, there are two types of the Dying_Gasp. One is Dying_Gasp (0) that is output when the ONU 10 disconnects a link and turns off the power and the other one is Dying_Gasp (1) that is output by the ONU 10 as the sleep request. The Dying_Gasp signal has a format containing a signal identifier indicating the Dying_Gasp signal, an ID of the ONU 10, and a flag (option) indicating the sleep request. The PON control unit 2 checks whether the received Dying_Gasp signal is the sleep request at Step S12, and in the case of the sleep request, i.e., the Dying_Gasp (1) signal, the process proceeds to the process at Step S13.

At Step S12, the PON control unit 2 detects that the ONU 10 is transitioned to the power-saving state and records this. Specifically, the PON control unit 2 performs a process of excluding the ID of the ONU 10 from the ActiveONUList that is an allocation target list of a transmission bandwidth. Moreover, the PON control unit 2 sets a timer of the sleep time with respect to the i-th ONU 10 for measuring a power-saving period (Step S14). This sleep time can be the time stored in the OLT 1 in advance or the time calculated based on a communication status, or a specific time can be obtained from the ONU 10 and this value can be set as the sleep time. Moreover, any method can be used for measurement of the sleep time as long as the power-saving period can be determined and the measurement can be performed also by measuring a relative time lapse counted up or counted down according to a predetermined elapsed time or by absolute time monitoring specifying absolute time of a clock. Next, the PON control unit 2 moves to the above upstream-data reception process (Step S9) and repeats the similar process. If the specification is such that upstream data can also be transmitted in the same bandwidth (or frame) together with the Dying_Gasp (1), there is an advantage that even in the state where the ONU 10 completes data transmission leaving only a small piece of data in the transmit buffer 12, the ONU 10 can immediately enter into the power-saving state. On the other hand, in the state capable of the power-saving state, because the ONU 10 does not have upstream data in many cases, the specification can be such that, when the sleep request is received, a process for upstream data of this frame is not performed.

On the other hand, at Step S12, when the PON control unit 2 determines that the Dying_Gasp (0) is received, the PON control unit 2 detects the state that the power of the ONU 10 is turned off (Step S15), and performs a process of removing the ONU 10 from the ActiveONUList and deleting information and resources of the link allocated to the ONU 10. At this time, the OLT 1 transmits a Deactivate signal (Deactivate_ONU-ID) indicating disconnection of the link and instructing to discard all information, such as link information, to the ONU 10. Upon reception of this signal, the ONU 10 turns off the power of the optical transceiver 14. When this process is finished, the PON control unit 2 returns to the process at Step S3 again to process the next bandwidth.

Step S17 is a process in the case where a valid signal is not received in the transmission bandwidth allocated to the ONU 10 at Step S6, and the PON control unit 2 detects a communication failure by this process. In the system having the power-saving mode in which the ONU 10 is in the power-saving state simply by turning off the power of the Tx 141 of the transceiver, the ONU 10 in the power-saving state does not, by necessity, transmit upstream data and the like, so that the OLT 1 cannot detect a failure. In this embodiment, the OLT 1 tentatively allocates a transmission bandwidth also to the ONU 10 in the power-saving operation and the ONU 10 tentatively turns on the power of the Tx 141 after the sleep time and transmits a frame. Therefore, at Step S6, a communication failure of an upstream link can be detected by determining whether the ONU 10 transmits a frame in the allocated transmission bandwidth. When a frame cannot be received in the bandwidth, the PON control unit 2 counts up the variable LOS[i] that counts the number of times of non-receipt with respect to the i-th ONU 10.

When the variable LOS[i] reaches a predetermined number of times LOS_Max (for example, four), the PON control unit 2 determines that communication abnormality occurs in the upstream link of the ONU 10 and issues the above alarm LOSi (Step S19). Moreover, the PON control unit 2 moves to the process at Step S16 and disconnects the link. On the other hand, when the variable LOS[i] has not reached the LOS_Max, the PON control unit 2 does not issue the alarm and returns to the process (Step S3) for the next bandwidth.

After performing the above process for all transmission bandwidths in one bandwidth update cycle, the PON control unit 2 checks whether there is the ONU 10 in which the sleep time expires for each ONU 10 in the power-saving operation. If the ONU 10 in which the sleep time expires is detected, the ID thereof is added to the ActiveONUList for tentatively waking up the ONU 10 (Step S20). With this process, the monitoring operation of the ONU 10 in the power-saving operation explained at Steps S17 to S19 becomes possible. Moreover, when the ONU 10 maintains the power-saving state, the sleep request is returned by using the transmission bandwidth allocated at Step S1, so that the ONU 10 can continue the operation in which power consumption is suppressed again while maintaining the link.

Next, the PON control unit 2 determines whether to continue the operation in the next bandwidth update cycle, and when the operation is continued, the process returns to the process at Step S1 and the above operation is resumed.

Details of Communication Control of ONU

Next, details of the communication process of the ONU 10 are explained with reference to FIG. 4.

Figure 4:
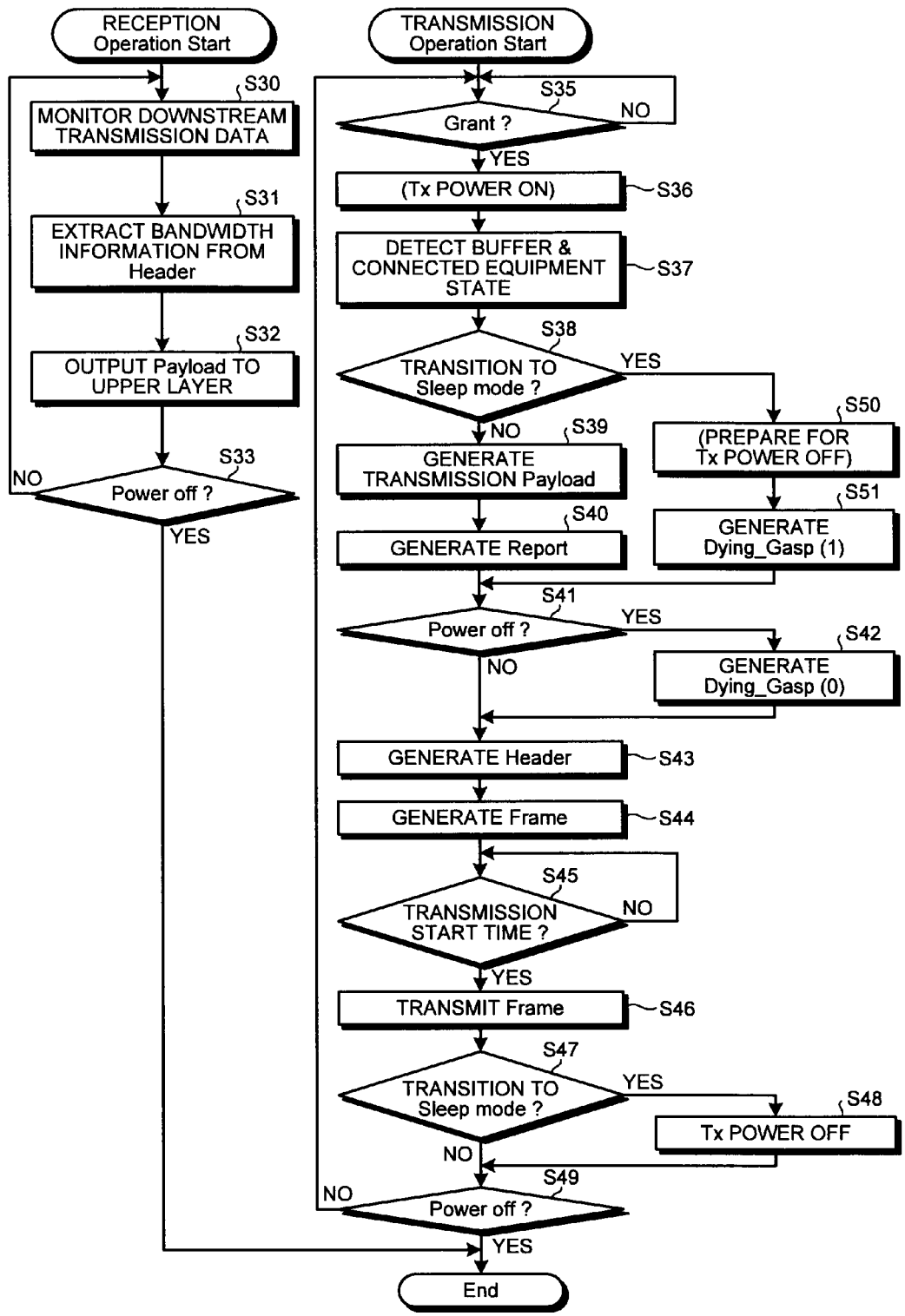
FIG. 4 is a flowchart illustrating a communication control of an ONU according to the first embodiment of the present invention.

FIG. 4 is a flowchart illustrating the communication control performed by the PON control unit 11 of the ONU 10. The communication control is roughly broken down into a downlink reception control (Steps S30 to S33) and an uplink transmission control (S35 to S51).

Downlink Reception Control

First, the reception control of a downlink is explained. The Rx 142 of the optical transceiver 14 receives a downlink frame transmitted from the OLT 1 and records this received data in the receive buffer 13. The PON control unit 11 monitors the frame received by the optical transceiver 14 (Step S30) and extracts transmission bandwidth information of the uplink from header information included in the frame (Step S31). The transmission bandwidth information includes information from which the ONU 10 as an allocation target can be specified and information from which a transmission start time and a transmission end time can be specified.

Moreover, the PON control unit 11 extracts a payload portion from the reception frame and outputs it to an upper-layer processing unit (Step S32). This process is a process for transmitting data received in an upper protocol suitable for the terminals 20-1, 2 connected to the ONU 10. Next, the PON control unit 11 determines whether to end the reception control and turn off the power, and when reception is continued without turning off the power, the process returns to Step S30 and the above reception control is continued.

Uplink Transmission Control

Next, the transmission control of an uplink is explained.

The PON control unit 11 waits for allocation (Grant) of a transmission bandwidth from the OLT 1 at Step S35. When a transmission bandwidth is allocated, the PON control unit 11 supplies power to the Tx 141 of the optical transceiver 14 to set to a laser-power-on state (Step S36). This process is necessary, particularly, when returning from the power-saving state, so that if the ONU 10 is in operation in a normal operation state and the Tx 141 is already in an on-state, the process of starting power supply does not need to be performed again.

The PON control unit 11 instructs power supply to the Tx 141 before the actual start time of a transmission bandwidth and at least the time period for the Tx 141 of the optical transceiver 14 to wake up and optical output to be stabilized in advance. The bandwidth update cycle of this embodiment is an extremely short cycle and transition from the power-saving state to the tentative wake-up state (Tentative wake-up) is extremely short time and is performed frequently. Accordingly, when the Tx 141 wakes up immediately before a transmission time without considering behavior of optical output at the time of waking up the Tx 141, effects, such as a non-receivable state and deterioration of an error rate, occur in the OLT 1. Thus, as shown in FIG. 4, when allocation of a transmission bandwidth is detected, the PON control unit 11 starts power supply to the Tx 141. Thereafter, other operations such as a frame generating operation are performed and transmission of a frame by the PON control unit 11 is actually performed at the subsequent Step S46.

Next, the PON control unit 11 detects a data storing state in the transmit buffer 12 and an operation state of connected equipment, such as the terminals 20-1 and 20-2, on the downstream side (Step S37) and determines whether to transition to the power-saving state (Sleep mode) (Step S38). For example, when the OLT 1 determines that the data storing state in the transmit buffer is a no-data state or is such that only a small amount of data of a predetermined threshold or less is stored in a predetermined period and there is room in the transmit buffer, the OLT 1 determines to transition to the power-saving state. In the power-saving state, an uplink is maintained, so that the ONU 10 needs to focus on the point that it is possible to transmit data in a relatively small bandwidth with respect to the capacity of the transmit buffer and a transmission rate of a communication line. Moreover, other examples of the criteria for the ONU 10 to transition to the power-saving state include (1) a power state of each terminal and the number of on-state terminals or the number of terminals responsive to communication, (2) whether transition of all of connected terminals (in the present embodiment, the terminals 20-1 and 20-2) to the power-saving state is detected, for example, by a method such as an LPI reception defined in IEEE802.3az, and the like.

When it is determined that the ONU 10 does not transition to the power-saving state, the PON control unit 11 generates a transmission payload based on transmission data stored in the transmit buffer (Step S39). This payload is data that is processed and generated in an upper layer. Next, in order to secure a transmission bandwidth of the next cycle, a status report is generated based on the data occupancy of the transmit buffer 12 and the like (Step S40). The report is generated, for example, by the PON control unit 11 expressing a ratio of data actually stored in the buffer with respect to a buffer size instructed by a protocol such as an OMCI (Optical Network Unit Management and Control Interface) and encoding this ratio by a predetermined encoding method. The status can be generated based on any criteria as long as communication traffic of an uplink is recognized. Moreover, when the TM-DBA is used, this report is not necessary.

On the other hand, when transitioning to the power-saving state, the PON control unit 11 records information (flag) indicating transition to the power-saving state in a built-in memory for transitioning to the power-saving state at Step S48 described later. Moreover, the PON control unit 11 generates the Dying_Gasp (1) signal that is the sleep request (Step S51).

At Step S41, the PON control unit 11 determines whether to turn off the power of the ONU 10. In the case of turning off the power, in order to insert the Dying_Gasp (0) into a transmission frame and transmit it to the OLT 1, the PON control unit 11 generates this signal (Step S42). When the power is turned off, power supply to the optical transceiver 14 including the Rx 142 is stopped and the ONU 10 becomes a state in which both transmission and reception are not possible. Accordingly, the PON control unit 11 actually turns off the power after Step S49 at which necessary transmission processes are finished.

The PON control unit 11 collects various signals generated at the above steps and generates a frame that accommodates them (Step S44). At this time, the PON control unit 11 generates a frame header (Step S43) and inserts it into the frame.

When generation of the frame is finished, the PON control unit 11 waits until the transmission start time specified in the transmission bandwidth information extracted at Step S31 (Step S45) and starts transmission of the frame (Step S46). When transmission of the frame is finished, the PON control unit 11 determines whether to transition to the power-saving state (Sleep mode) (Step S47), and in the case of transitioning to the power-saving state, the PON control unit 11 stops power supply to the Tx 141 (Step S48). Specifically, the PON control unit 11 can cause the Tx 141 to transition to the power-saving state by transmitting an electrical signal, such as a power-down and a shut-down, to the Tx 141 of the optical transceiver 14. With this process, the PON control unit 11 generates an intermittent transmission stop period (stop period of the transmitting unit) in the sleep mode.

Finally, the PON control unit 11 determines whether to turn off the power or to be on standby for the next transmission (Step S49), and in the case of turning off the power, the PON control unit 11 turns off the power of the optical transceiver 14 and the like and ends the process. When the Dying_Gasp (0) signal is not correctly transmitted to the OLT 1 due to a single communication error, unnecessary alarm is issued frequently in the OLT 1, so that the power can be turned off after transmitting the Dying_Gasp (0) signal a plurality of times before turning off the power. In this case, the PON control unit 11 counts the number of times of transmission of the Dying_Gasp (0) signal at Step S49 and controls to return to the process at Step S35 until reaching a predetermined number of times.

On the other hand, when the PON control unit 11 determines not to turn off the power, the PON control unit 11 returns to Step S35 and repeats the processes similar to the above.

Operation at the Time of Occurrence of Failure

Next, the operation of the communication system when a communication failure occurs is explained.

Figure 5:
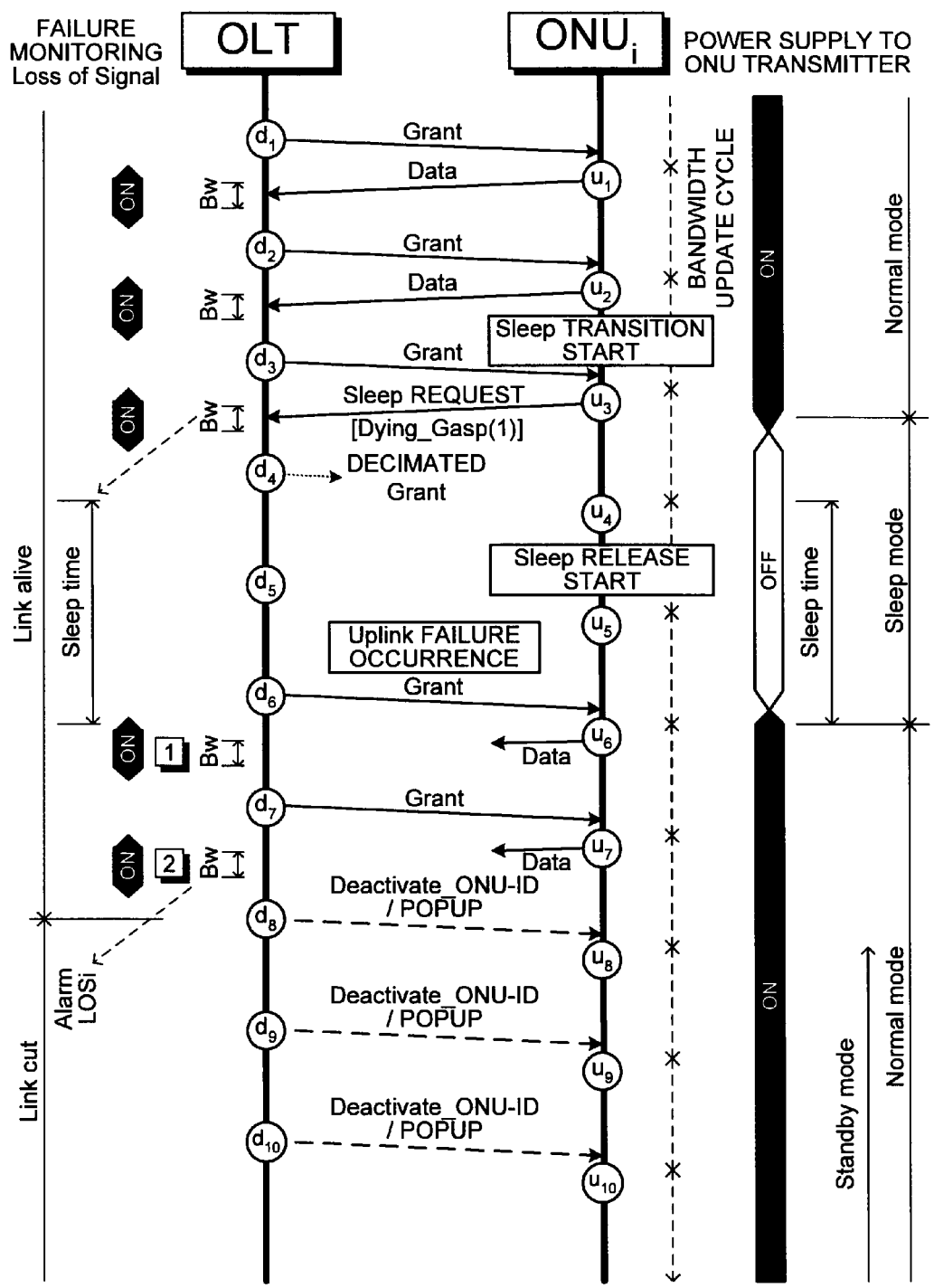
FIG. 5 is a sequence diagram illustrating a communication method (at the time of occurrence of a failure) according to the first embodiment of the present invention.

FIG. 5 is a sequence diagram illustrating the case where a communication failure occurs in the ONU 10 in operation in the power-saving state. The ONU 10 transitions to the power-saving state after the transmission timing (u3), and thereafter, receives a large amount of transmission data from the terminal 20-1 and tries to return from the power-saving state after the timing (u4). If a communication failure occurs in the upstream communication path 30, data transmission cannot be performed. Because the OLT 1 knows that the ONU 10 turns off the power of the Tx 141 of the optical transceiver 14 and does not transmit data, temporary absence of an uplink communication is not abnormal when viewed from the OLT 1 and the OLT 1 cannot detect occurrence of abnormality. However, in the communication system in this embodiment, while suppressing an upstream communication of the ONU 10 during the sleep time, a transmission bandwidth is tentatively allocated to the ONU 10 in the power-saving state after the sleep time (d6). Therefore, the OLT 1 can detect whether there is communication abnormality (Loss of Signal for ONUi) in a link to the ONU 10 in the power-saving state by monitoring the bandwidth allocated at (d6).

In the example in FIG. 5, when there is no response signal from the ONU 10 in the bandwidth Bw allocated at the timing (d6), the bandwidth Bw is allocated to the same ONU 10 also at the following timing (d7), so that bandwidth monitoring is performed twice in total and the LOSi alarm is output based on the second bandwidth monitoring result. This bandwidth allocation does not need to allocate in the continuous bandwidth update frequencies and can be transmitted intermittently. Moreover, the number of times of monitoring can also be set to any number.

The OLT 1 that output the alarm LOSi disconnects a link to the ONU 10 and notifies the ONU 10 of that effect by outputting the Deactivate_ONU-ID three times. The ONU 10 that received the Deactivate_ONU-ID detects disconnection of the link and needs to discard stored information on the link and stop data transmission. Thereafter, the ONU 10 transitions to a communication standby state (standby mode) from the OLT 1.

After the link is disconnected, for the ONU 10 to reconnect to the OLT 1, the ONU 10 responds to a discovery request transmitted from the OLT 1 and registers itself in the OLT 1. The OLT 1 registers the ONU 10 by the discovery and does not allocate a transmission bandwidth to the ONU 10 until a link is established.

Operation at the Time of Power-Off

Next, the operation when the ONU 10 turns off the power is explained.

Figure 6:
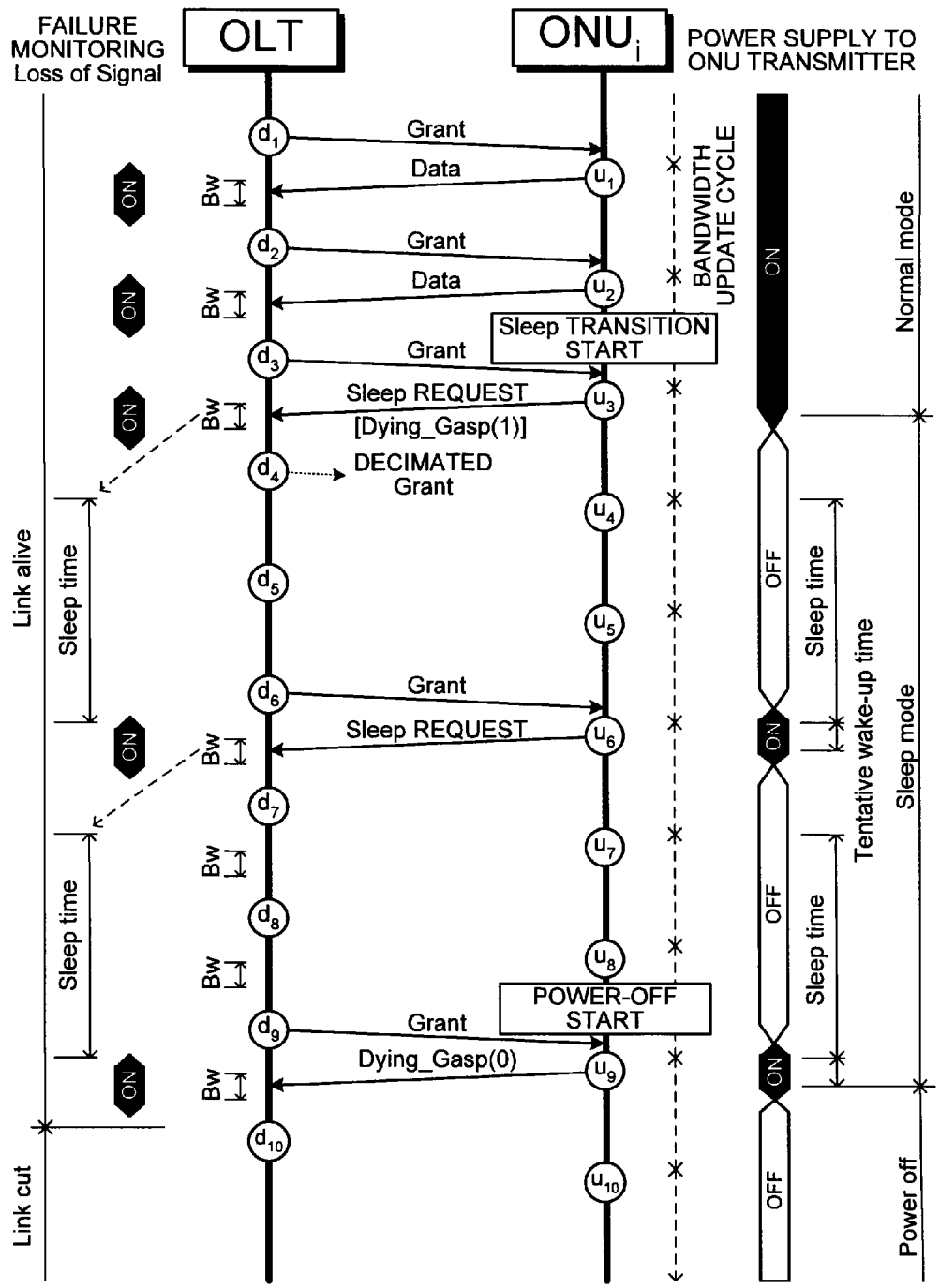
FIG. 6 is a sequence diagram illustrating a communication method (at the time of power-off) according to the first embodiment of the present invention.

FIG. 6 is a sequence diagram explaining the case where the ONU 10 turns off the power after the power-saving state. The ONU 10 performs an operation in the power-saving state until the timing (u8), however, for example, when a user performs an operation to turn off the power of the ONU 10, there arises the necessity of starting an operation of turning off the power in the ONU 10. At this time, if the ONU 10 turns off the power immediately from the power-saving state, the OLT 1 cannot detect this and issues the LOSi. Therefore, the ONU 10 waits until bandwidth allocation after the sleep time (d9) and transmits the Dying_Gasp (0) signal to the OLT 1 (u9), and thereafter, turns off the power.

On the other hand, the OLT 1 can also recognize that a communication failure with the ONU 10 occurs or the ONU 10 has not returned from the sleep state by receiving the Dying_Gasp (0) signal, so that unnecessary alarm output can be prevented.

Variable Setting of Sleep Time and Acknowledgement

Figure 7:
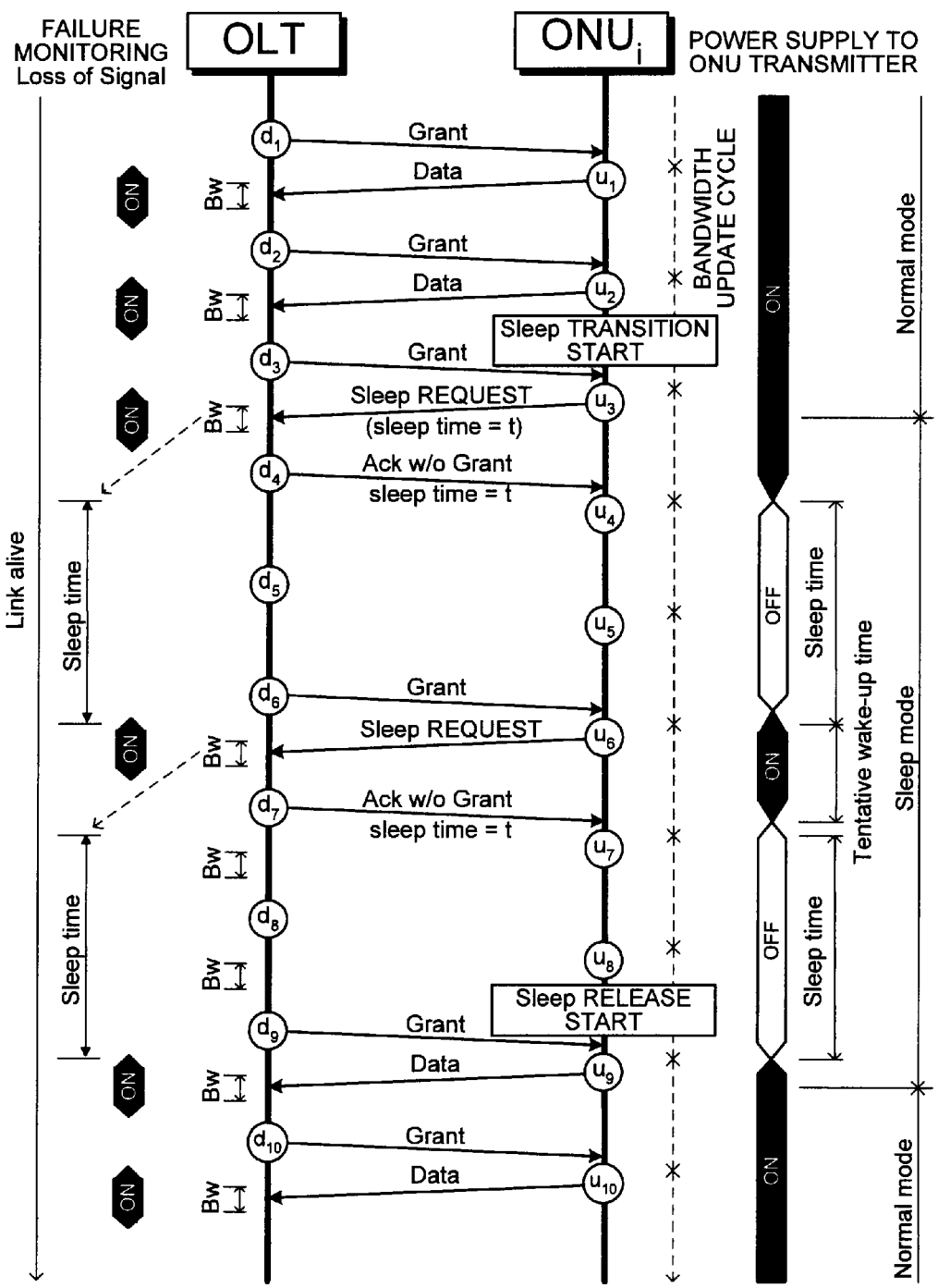
FIG. 7 is a sequence diagram illustrating a communication method (modified example) according to the first embodiment of the present invention.

FIG. 7 illustrates a sequence of a communication method of determining the sleep time in the power-saving state by signaling. When outputting the sleep request, the ONU 10 specifies the sleep time that is set according to the communication state of itself and outputs it to the OLT 1. For example, when there is no upstream data, the ONU 10 sets the sleep time long, and, in the case of an extremely small bandwidth or when intermittent communication continues, the ONU 10 sets the sleep time short (however, the ONU 10 is transitioned to the power-saving state). In this manner, the ONU 10 can output the sleep request with the sleep time changed according to the communication state of the ONU 10 (u3).

On the other hand, the OLT 1 also can set the sleep time according to the request from the ONU 10 and a network condition such as a maximum delay condition. When the sleep request is received from the ONU 10, this OLT 1 determines whether the sleep state can be granted, and determines a sleep time that can be granted while considering the requested sleep time and transmits the acknowledgement signal (Acknowledgement) with respect to the sleep request together with this sleep time (d4). It is applicable that the OLT 1 does not notify of transmission bandwidth allocation to the ONU 10 together with the acknowledgement signal.

The ONU 10 does not transition to the power-saving state until receiving the acknowledgement signal and transitions to the power-saving state after receiving the acknowledgement signal. In this manner, false recognition of the state with the OLT 1 does not occur by waiting for the acknowledgement signal, enabling to suppress the situation in which the OLT 1 erroneously issues an alarm. Moreover, the ONU 10 can operate in the power-saving state during the granted sleep time, so that reduction of power consumption and balance of communication can be appropriately adjusted according to the communication state.

In the above explanation, both the ONU 10 and the OLT 1 transmit the sleep time, alternatively, only any one of the apparatuses can transmit the sleep time for enabling to adjust the sleep time. Moreover, the communication system can use a sequence with no acknowledgement signal.

Second Embodiment

The second embodiment is an embodiment in which a transmission bandwidth is allocated also to the ONU 10 in the power-saving state (sleep mode) to reduce delay of a sleeping upstream. The hardware configuration of the communication system is similar to the above communication system explained in FIG. 1.

Figure 8:
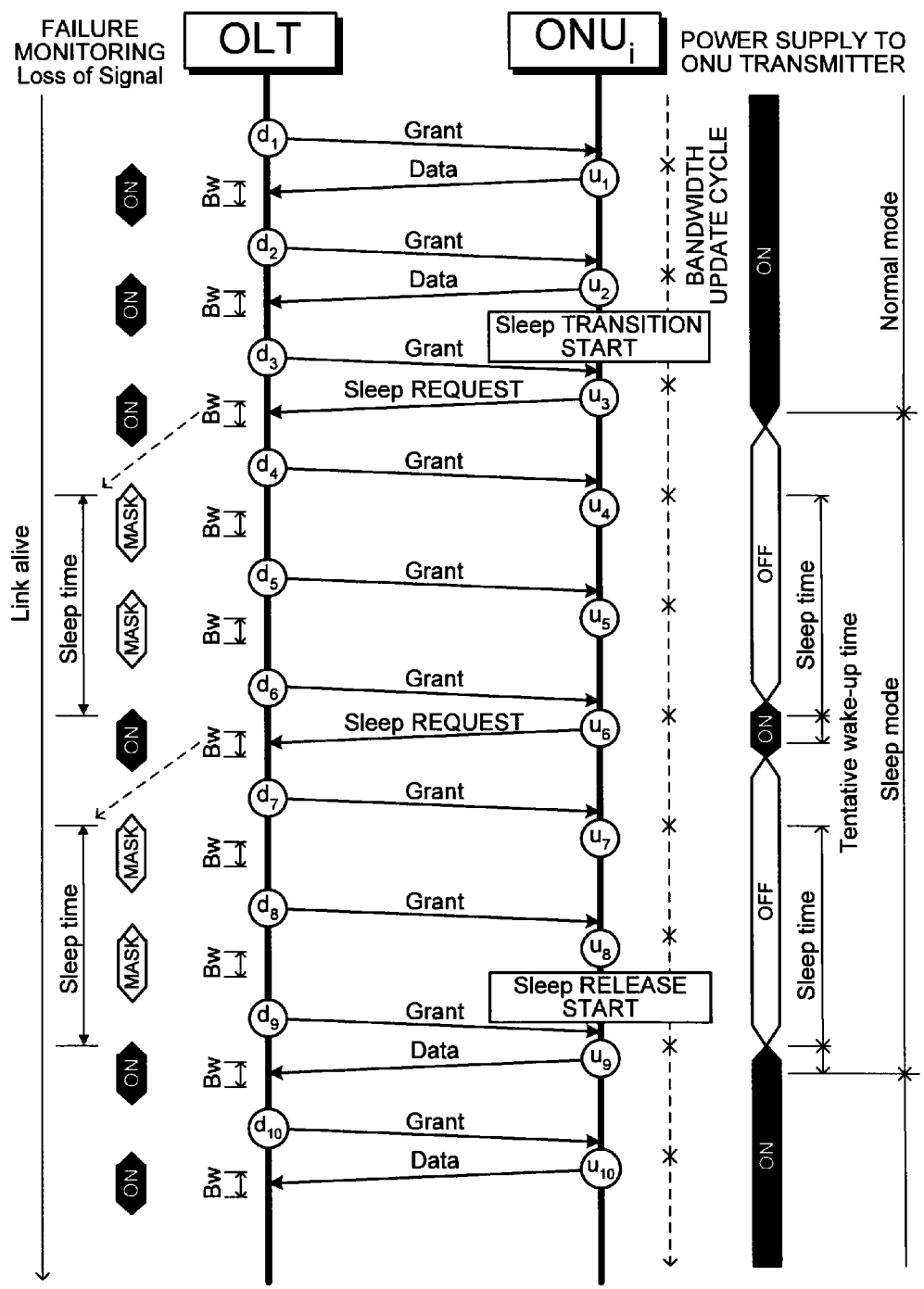
FIG. 8 is a sequence diagram illustrating a communication method according to a second embodiment of the present invention.

FIG. 8 is a sequence illustrating a communication method of this embodiment. In FIG. 8, as is apparent from the transmission timings (d4), (d5), (d7), and (d8) of the OLT 1, in this embodiment, the OLT 1 allocates a transmission bandwidth also to the ONU 10 in the sleep mode different from the sequence in FIG. 2. Accordingly, the ONU 10 can release the sleep mode without waiting for the end of the sleep mode and transition to the normal mode to resume transmission of upstream data.

On the other hand, in terms of alarm monitoring, the ONU 10 in the sleep mode transmits or does not transmit a frame at its own decision, so that a device is needed. Therefore, the OLT 1 monitors a transmission bandwidth allocated to the ONU 10 in the sleep mode, however, masks the count of the LOSi for alarm monitoring to perform control not to output an alarm even if a valid signal cannot be received in this transmission bandwidth. The alarm monitoring state of the Loss of Signal is indicated by "ON" (monitoring valid) and "MASK" (monitoring invalid) on the left side in FIG. 8. From this drawing, it is found that alarm monitoring of the Loss of Signal is "MASKed" during the sleep time.

Details of Communication Control of OLT

Next, details of the communication process of the OLT 1 is explained with reference to FIG. 9.

Figure 9:
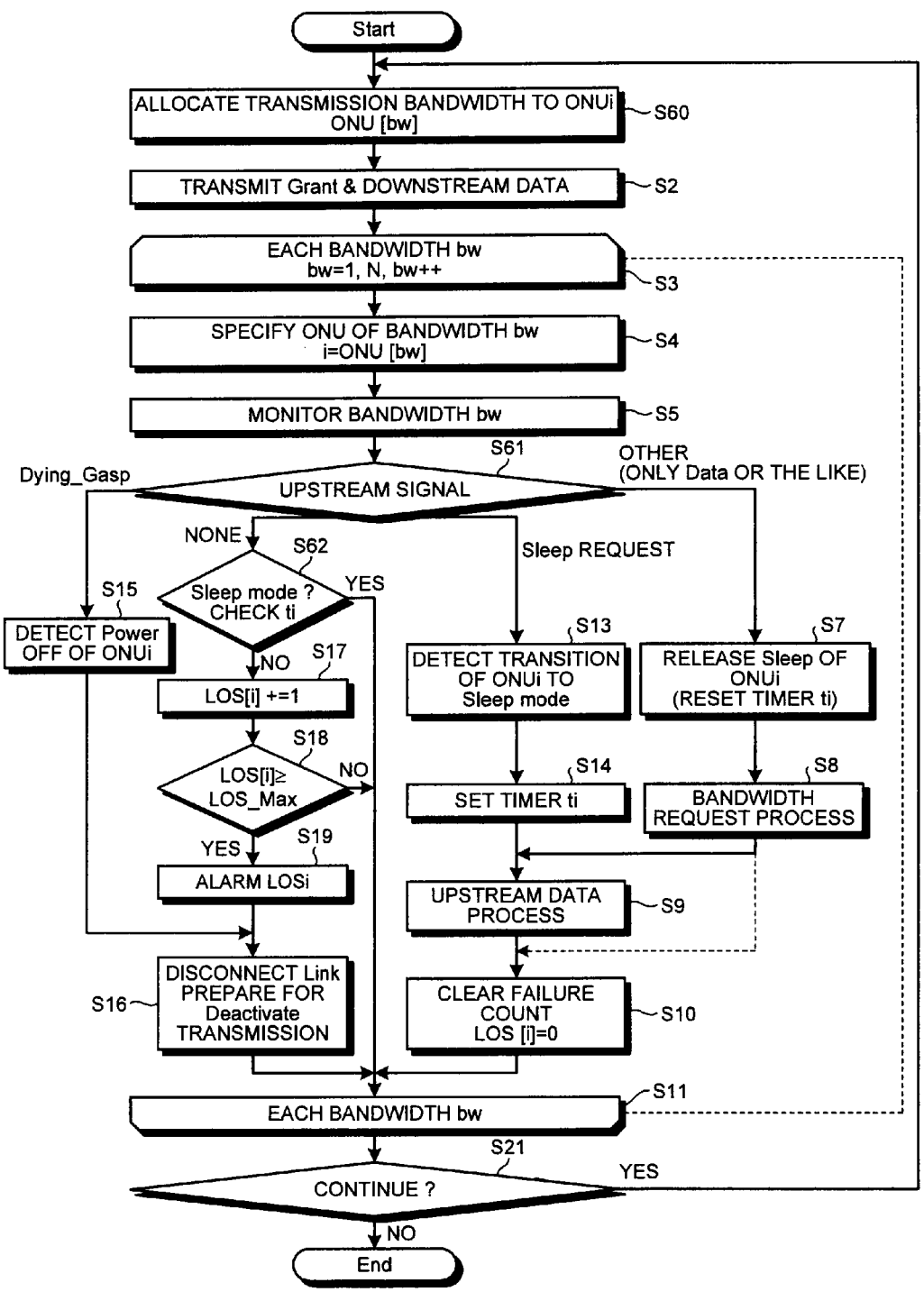
FIG. 9 is a flowchart illustrating a communication control of an OLT according to the second embodiment of the present invention.

FIG. 9 illustrates the process of the PON control unit 2 of the OLT 1. In FIG. 9, the same reference letters as those in FIG. 3 illustrate the same or corresponding processes in FIG. 3. In FIG. 3, the PON control unit 2 controls not to allocate a transmission bandwidth to the ONU 10 in the power-saving state at Step S1 and Step S13. On the other hand, in the control in FIG. 9, the PON control unit 2 allocates a transmission bandwidth also to the ONU 10 in the sleep mode at Step S60. It is considered that a necessary transmission bandwidth of the ONU 10 in operation in the sleep mode is small, so that the PON control unit 2 allocates a transmission bandwidth smaller than the ONU 10 in the normal mode.

At Step S61, the type of an upstream signal is identified, and the PON control unit 2 detects the sleep request by a PLOAM (Physical Layer OAM operations, Administrations and Maintenance) message instead of the Dying_Gasp (1) signal. In the sleep request, an identifier (identifier of a link to the ONU 10 is also available) with which the ONU 10 can be specified and an identifier of the message type indicating that the PLOAM message is the sleep request are included. The sleep request can be the Dying_Gasp (1) signal in the similar manner to the first embodiment. When the sleep request is included in the received upstream signal, the PON control unit 2 detects that the ONU 10 transitions to the sleep mode at Step S13, however, at this time, the ONU 10 does not need to be removed from the allocation target of a transmission bandwidth as described above.

Moreover, in the bandwidth BW at Step S61, when it is determined that there is no valid received signal, the PON control unit 2 detects whether the ONU 10 allocated to the bandwidth is in the sleep mode by checking a timer ti at Step S62. Then, when the PON control unit 2 determines that the ONU 10 is in the sleep mode, the PON control unit 2 masks the alarm process (Steps S17 to S19) and moves to Step S11 to perform a process for the next transmission bandwidth.

As above, the OLT 1 includes means for preventing a false alarm of failure monitoring by allowing not to transmit a frame to the ONU 10 in the sleep mode while allocating a transmission bandwidth to the ONU 10 in the sleep mode.

Details of Communication Control of ONU

Next, details of the communication process of the ONU 10 is explained with reference to FIG. 10.

Figure 10:
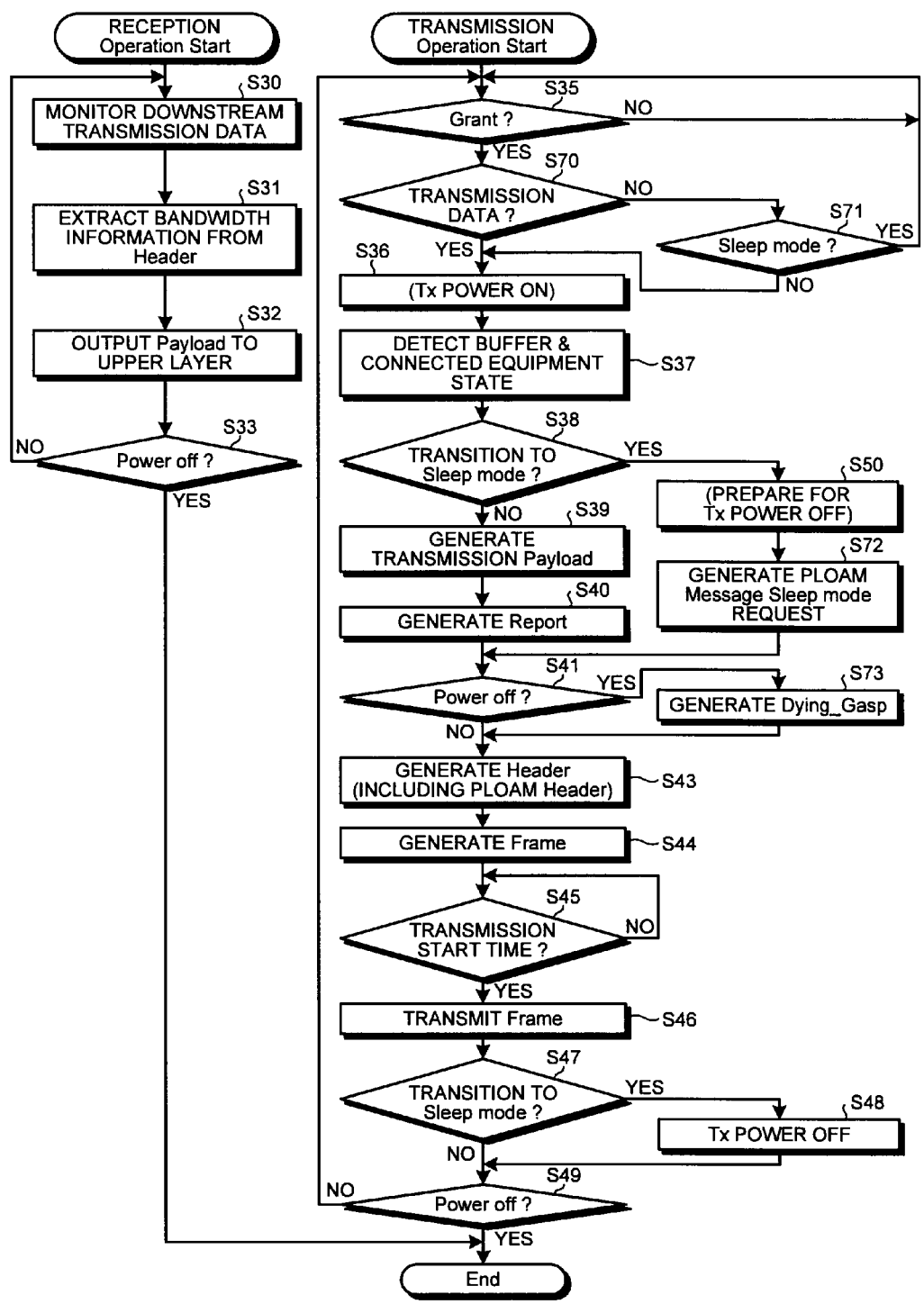
FIG. 10 is a flowchart illustrating a communication control of an ONU according to the second embodiment of the present invention.

FIG. 10 is a flowchart illustrating the communication control performed by the PON control unit 11 of the ONU 10. In FIG. 10, the same reference letters as those in FIG. 4 illustrate the same or corresponding processes in FIG. 4. In the communication control in FIG. 10, even if a transmission bandwidth is allocated in the sleep mode, the ONU 10 does not transmit data by using the transmission bandwidth in the sleep mode (Steps S70 and S71). Therefore, the ONU 10 does not need to wake up the Tx 141 and thus can save power consumption. Moreover, at Step S70, the PON control unit 11 determines whether there is transmission data, and when there is transmission data even in the sleep mode, the PON control unit 11 performs the transmission process following Step S36. Therefore, in the ONU 10 that employs the communication method described in FIG. 10, the sleep mode can be released before the sleep time expires and transmission delay in the sleep mode can be reduced.

At Step S72, the PON control unit 11 generates the sleep request using the PLOAM message instead of the Dying_Gasp (1) signal in FIG. 4. On the other hand, at Step S73, a normal Dying_Gasp signal is generated as the Dying_Gasp signal at the time of power-off.

Operation at the Time of Occurrence of Failure

Next, the operation of the communication system when a communication failure occurs is explained.

Figure 11:
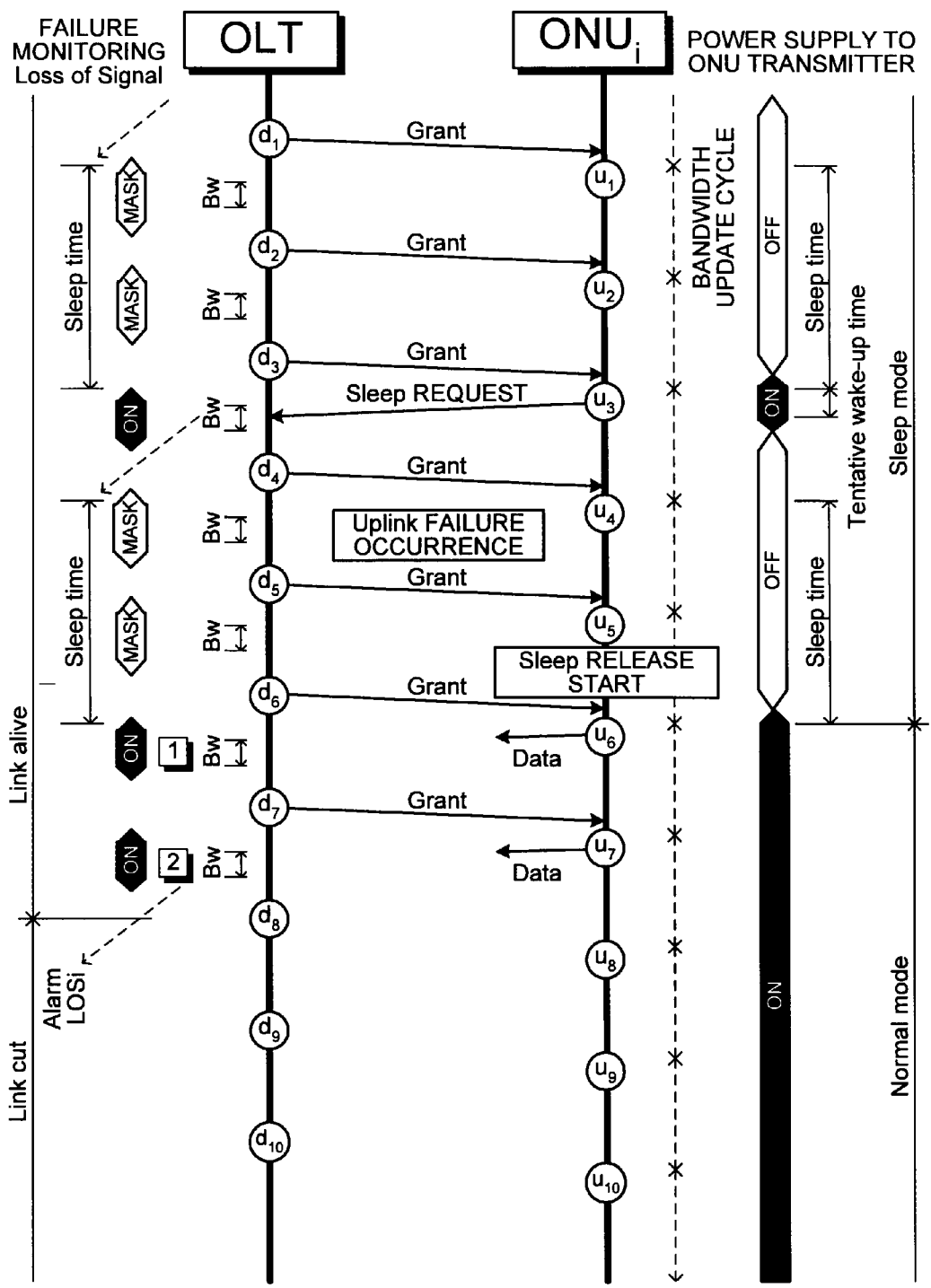
FIG. 11 is a sequence diagram illustrating a communication method (at the time of occurrence of a failure) according to the second embodiment of the present invention.

FIG. 11 is a sequence diagram illustrating the case where a communication failure occurs in the ONU 10 in operation in the power-saving state. At the timings (d1), (d2), (d5), and (d6) in the sleep mode, failure monitoring is masked and thus the LOSi is not erroneously detected. On the other hand, when a failure occurs in an uplink after the transmission timing (u4) of the ONU 10, the OLT 1 detects a failure of the LOSi in the transmission bandwidth Bw allocated at the transmission timings (d6) and (d7) of the OLT 1 and outputs the alarm LOSi.

Operation at the Time of Power-Off

Next, the operation when the ONU 10 turns off the power is explained.

Figure 12:
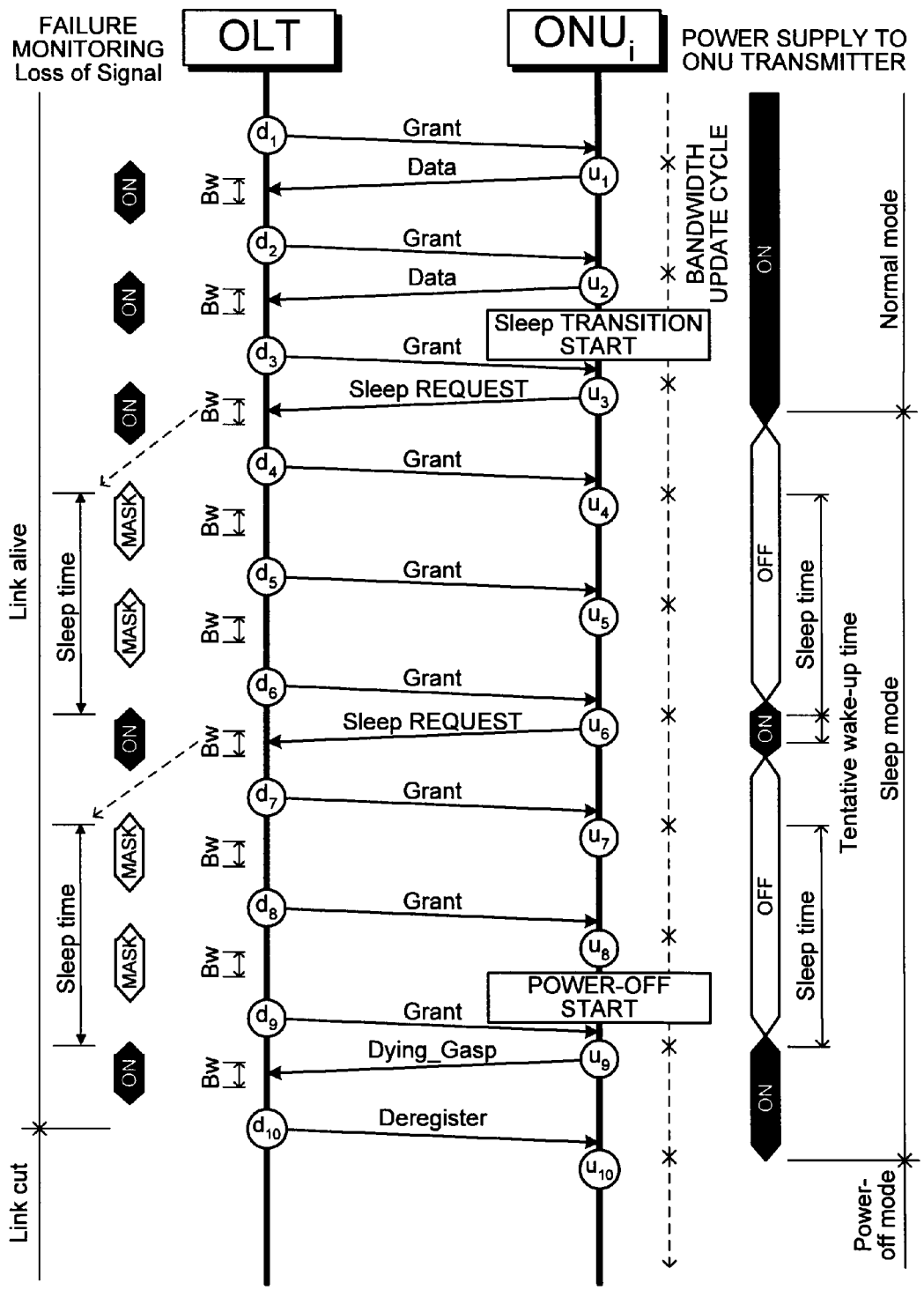
FIG. 12 is a sequence diagram illustrating a communication method (at the time of power-off) according to the second embodiment of the present invention.

FIG. 12 is a sequence diagram explaining the case where the ONU 10 turns off the power after the power-saving state. The ONU 10 performs an operation in the power-saving state until the timing (u8), however, for example, when a user performs an operation to turn off the power of the ONU 10, there arises the necessity of starting an operation of turning off the power in the ONU 10. At this time, if the ONU 10 turns off the power immediately from the power-saving state, the OLT 1 cannot detect this and issues the LOSi. Therefore, the ONU 10 waits until bandwidth allocation after the sleep time (d9) and transmits the Dying_Gasp signal to the OLT 1 (u9), and thereafter, turns off the power.

On the other hand, the OLT 1 can also recognize that a communication failure with the ONU 10 occurs or the ONU 10 has not returned from the sleep state by receiving the Dying_Gasp signal, so that unnecessary alarm output can be prevented.

Variable Setting of Sleep Time and Acknowledgement

Figure 13:
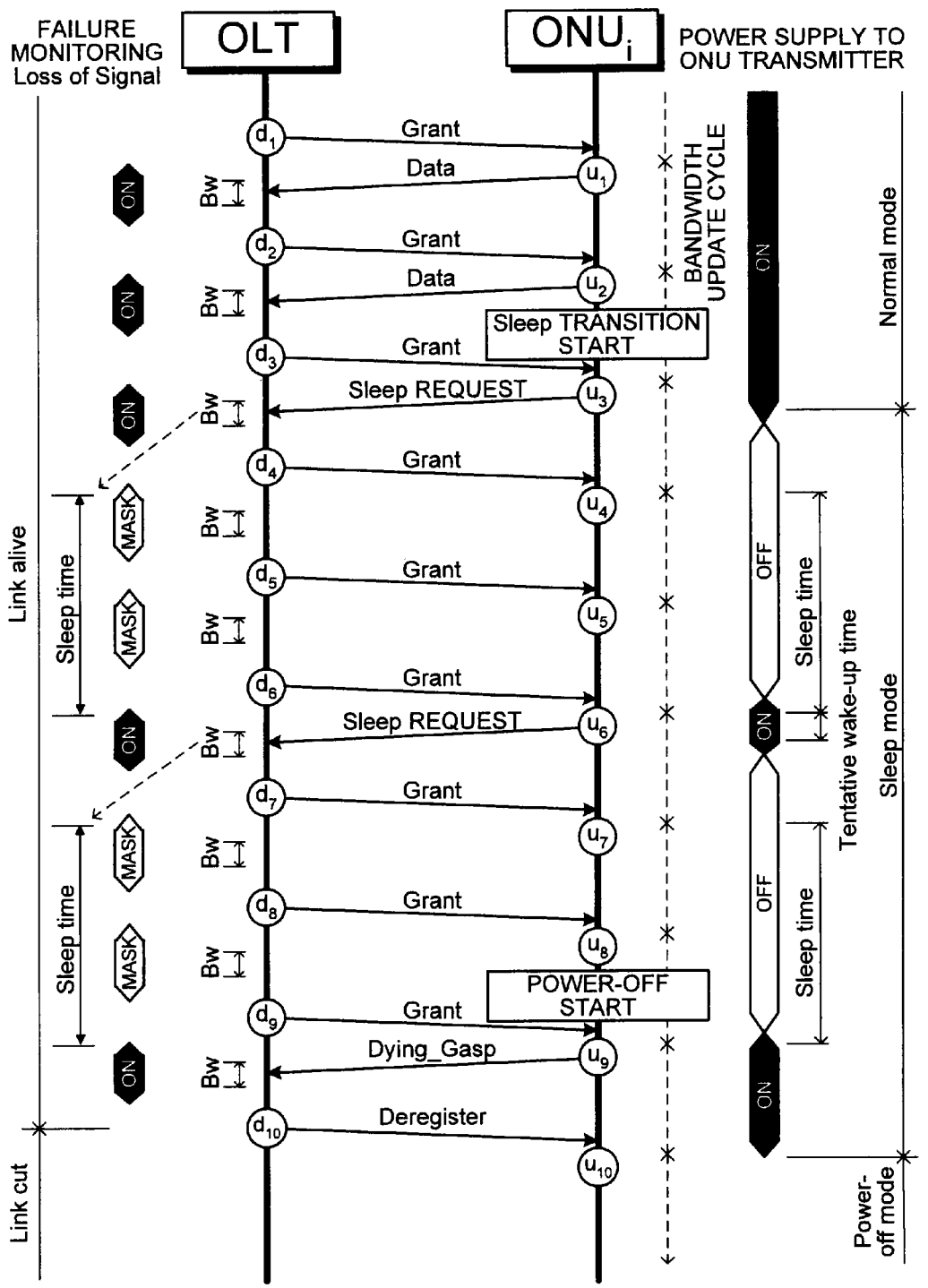
FIG. 13 is a sequence diagram illustrating a communication method (modified example) according to the second embodiment of the present invention.

FIG. 13 illustrates a sequence of a communication method of determining the sleep time in the power-saving state by signaling in the similar manner to FIG. 7. When outputting the sleep request, the ONU 10 specifies the sleep time that is set according to the communication state of itself and outputs it to the OLT 1. For example, when there is no upstream data, the ONU 10 sets the sleep time long, and, in the case of an extremely small bandwidth or when intermittent communication continues, the ONU 10 sets the sleep time short (however, the ONU 10 is transitioned to the power-saving state). In this manner, the ONU 10 can output the sleep request with the sleep time changed according to the communication state of the ONU 10 (u3).

On the other hand, the OLT 1 also can set the sleep time according to the request from the ONU 10 and a network condition such as a maximum delay condition. When the sleep request is received from the ONU 10, this OLT 1 determines whether the sleep state can be granted, and determines a sleep time that can be granted while considering the requested sleep time and transmits the acknowledgement signal (Acknowledgement) with respect to the sleep request together with this sleep time (d4). It is applicable that the OLT 1 does not notify of transmission bandwidth allocation to the ONU 10 together with the acknowledgement signal.

The ONU 10 does not transition to the power-saving state until receiving the acknowledgement signal and transitions to the power-saving state after receiving the acknowledgement signal. In this manner, false recognition of the state with the OLT 1 does not occur by waiting for the acknowledgement signal, enabling to suppress the situation in which the OLT 1 erroneously issues an alarm. Moreover, the ONU 10 can operate in the power-saving state during the granted sleep time, so that reduction of power consumption and balance of communication can be appropriately adjusted according to the communication state.

In the above explanation, both the ONU 10 and the OLT 1 transmit the sleep time, however, only any one of the apparatuses can transmit the sleep time for enabling to adjust the sleep time. Moreover, a sequence with no acknowledgement signal can also be used.

Explicit Release of Sleep Mode by PLOAM Message

Figure 14:
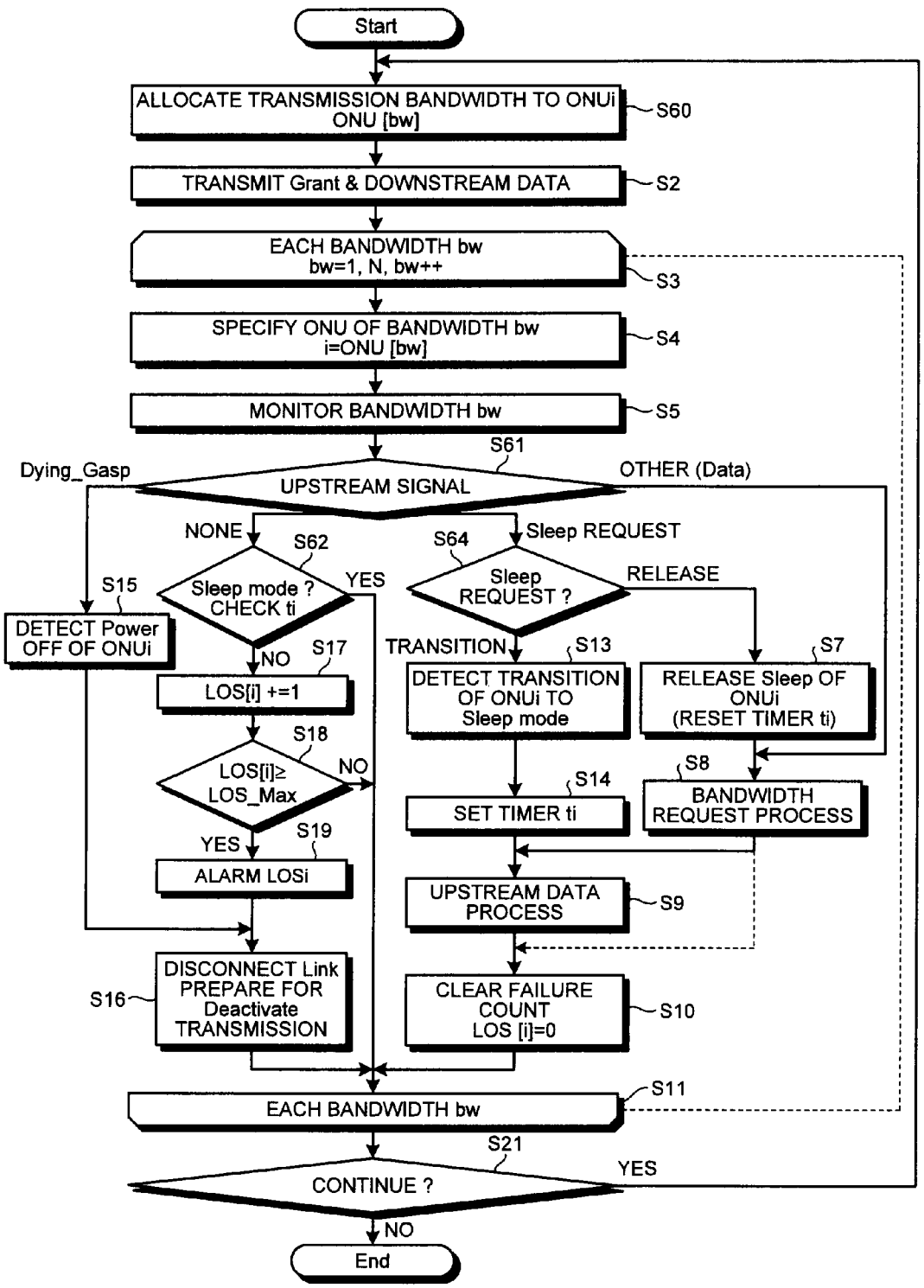
FIG. 14 is a flowchart illustrating a communication control (modified example) of an OLT according to the second embodiment of the present invention.

In the above first and second embodiments, when returning from the power-saving state (sleep mode) to the normal mode, the ONU 10 performs data transmission, which is not accompanied with the sleep request, in the allocated bandwidth. The OLT 1 detects that the ONU 10 transitions to the normal mode by receiving this data transmission, however, the ONU 10 and the OLT 1 can perform the release of this power-saving state (sleep mode) by using an explicit sleep release request using the PLOAM Message. The flowchart of FIG. 14 illustrates the communication control of the OLT 1 that processes this explicit Sleep release request. In FIG. 14, the same reference letters as those in FIG. 9 illustrate the same or corresponding processes in FIG. 9.

The Step S64 in FIG. 14 is a process of determining whether the sleep request received by the OLT 1 is the transition request or the release request. The format of the PLOAM Message can be any format. For example, the sleep request includes an identifier (identifier of a link to the ONU 10 is also available) with which the ONU 10 can be specified, an identifier of the message type indicating that the PLOAM message is the sleep request, and a flag indicating any one of transition/release. This flag is a flag indicating whether the sleep request requests transition to the sleep mode or to the requests release. Moreover, as another example, a method of allocating the identifier of the message type to be distinguishable between transition/release instead of the flag is considered. Release of the sleep mode is explicitly performed in this manner, so that both the ONU 10 and the OLT 1 can recognize transition and release of the sleep mode more surely and therefore the process becomes more reliable. Moreover, if a handshake method of returning the Acknowledgement signal to release of the sleep mode is employed, reliability of the communication system is further improved.

The embodiments of this invention are explained above. This invention is not limited to these embodiments and any modifications can be made as long as the modification is within the scope of this invention. For example, the communication system to which this communication method is applied does not need to be the PON system, and can be also applied to an optical communication system using an active element. Moreover, it is possible to apply to a communication system that communicates between terminals by using electrical signals without being limited to an optical communication.

The communication system or the communication method of this invention is an excellent communication system firstly capable of suppressing power consumption. Accordingly, the effect of the invention is obtained that it is possible to use even if a failure monitoring function is removed from the above embodiments and power consumption can be suppressed even in this case. Moreover, as a second additional effect, there is a feature that failure monitoring can be performed while maintaining a link in the communication system in which power consumption is suppressed.

INDUSTRIAL APPLICABILITY

This invention is suitable for a communication method and a communication system that need power saving.

REFERENCE SIGNS LIST

1 OLT
2 PON CONTROL UNIT
3, 13 RECEIVE BUFFER
4, 12 TRANSMIT BUFFER
5, 14 OPTICAL TRANSCEIVER
6 WDM
7 PHY
10-1 to 10-3 ONU
11 PON CONTROL UNIT
20-1, 20-2 TERMINAL
30 SUBSCRIBER LINE
40 SPLITTER
51, 142, 161-1, 161-2 Rx
52, 141, 162-1, 162-2 Tx

The invention claimed is:

1. A communication method of an optical communication system in which a plurality of user-side optical-line terminals (ONUs) are connected to a station-side optical-line terminal (OLT) by using a common optical fiber, comprising the following steps (a) to (c):
  (a) allocating, by the OLT, a transmission bandwidth to an ONU, the ONU capable of an operation in a sleep mode in which an optical transmitter of the ONU is tentatively halted for a predetermined sleep period, and transmitting a transmission bandwidth notification to the ONU when the ONU is in the sleep mode and when the ONU is not in the sleep mode;
  (b) receiving, from the ONU to which the transmission bandwidth is allocated, a response signal when the ONU is not in the sleep mode, wherein the response signal is or is not received during the sleep mode; and
  (c) suppressing, by the OLT, an alarm in the sleep mode of the ONU, the alarm being caused by a communication failure with the ONU on a basis of the response signal not being received from the ONU.

2. The communication method according to claim 1, wherein
  the OLT is notified by the ONU of transition to the sleep mode, and
  the OLT detects that the ONU is in the sleep mode on a basis of the notification.

3. The communication method according to claim 1, wherein the OLT receives a notification of transition to the sleep mode from the ONU when the ONU continues the sleep mode after an end of the sleep period.

4. The communication method according to claim 1, wherein the OLT maintains a communication link with the ONU with respect to which the alarm is suppressed and which is transitioned to the sleep mode.

5. The communication method according to claim 1, wherein the OLT detects a Loss of Signal with respect to each of the ONUs as the alarm and masks an alarm of a Loss of Signal during the sleep period with respect to an ONU in the sleep mode.

6. An optical communication system in which a plurality of user-side optical-line terminals (ONUs) are connected to a station-side optical-line terminal (OLT) by using a common optical fiber, wherein
  an ONU includes
    an optical transceiver that is connected to the optical fiber, the ONU capable of an operation in a sleep mode in which a transmission unit of the ONU is tentatively stopped for a sleep period, and
    a control device that is configured to be capable of omitting transmission of a response signal to the OLT when a transmission bandwidth is allocated to the ONU by the OLT during the sleep mode, and
  the OLT includes
    an optical transceiver connected to the optical fiber, and
    a control device that detects an alarm for a communication failure with the ONU by allocating the transmission bandwidth to the ONU and monitoring the transmission bandwidth allocated to the ONU and suppresses the alarm to the ONU during a sleep mode of the ONU in which the transmission unit of the ONU is tentatively stopped.

7. The optical communication system according to claim 6, wherein
  the control device of the ONU causes the transmission unit to wake up and transmits the response signal when returning from the sleep mode to a normal mode, and
  the control device of the OLT detects that the ONU returns to a normal mode and performs failure monitoring in a normal mode when the response signal is received from the ONU.

8. The optical communication system according to claim 6, wherein the control device of the OLT notifies the ONU of a signal in which the sleep period is specified.

9. A user-side optical-line terminal apparatus of an optical communication system that connects a plurality of user-side optical-line terminal apparatuses to a station-side optical-line terminal apparatus by using a common optical fiber, in which the station-side optical-line terminal apparatus suppresses an alarm due to a communication failure with the user-side optical-line terminal apparatus on a basis of a response signal from the user-side optical-line terminal apparatus during a sleep mode of the user-side optical-line terminal apparatus, the user-side optical-line terminal apparatus comprising:
  an optical transceiver that is connected to the optical fiber and that is capable of an operation of a sleep mode in which power consumption is reduced by tentatively stopping a transmission unit for the sleep period; and
  a control device that is configured to be capable of omitting transmission of a response signal to the station-side optical-line terminal apparatus during the sleep mode when a transmission bandwidth is allocated by the station-side optical-line terminal apparatus, during the sleep mode, to the user-side optical-line terminal apparatus.

10. The user-side optical-line terminal apparatus according to claim 9, wherein the user-side optical-line terminal apparatus causes the transmission unit of the optical transceiver to wake up before the sleep period expires without omitting the response signal and starts data transmission during the sleep period.

11. The user-side optical-line terminal apparatus according to claim 9, wherein the control device notifies the station-side optical-line terminal apparatus of transition to the sleep mode when transitioning to the sleep mode.

12. The user-side optical-line terminal apparatus according to claim 9, wherein the control device transmits the response signal in the transmission bandwidth by the optical transceiver when returning from the sleep mode to a normal mode.

13. The user-side optical-line terminal apparatus according to claim 9, wherein the control device sets a length of the sleep period shorter than an MPCP (Multi-Point Control Protocol) timeout.

14. A station-side optical-line terminal apparatus of an optical communication system that connects a plurality of user-side optical-line terminal apparatuses to a station-side optical-line terminal apparatus by using a common optical fiber, comprising:
   an optical transceiver connected to the optical fiber; and
   a control device that detects an alarm for a communication failure with the user-side optical-line terminal apparatus by allocating a transmission bandwidth to the user-side optical-line terminal apparatus and monitoring the transmission bandwidth allocated to the user-side optical-line terminal apparatus in the sleep mode and suppresses the alarm to the user-side optical-line terminal apparatus in the sleep mode in which a transmission unit included in the user-side optical-line terminal apparatus is tentatively stopped.

15. The station-side optical-line terminal apparatus according to claim 14, wherein the control device maintains a communication link with the user-side optical-line terminal apparatus with respect to which the alarm is suppressed and which is transitioned to the sleep mode.

16. The station-side optical-line terminal apparatus according to claim 14, wherein the control device detects a Loss of Signal with respect to each of the user-side optical-line terminal apparatuses as the alarm and masks an alarm of a Loss of Signal during the sleep period with respect to a user-side optical-line terminal apparatus in the sleep mode.

17. The station-side optical-line terminal apparatus according to claim 14, wherein
   the optical transceiver receives a notification indicating that the user-side optical-line terminal apparatus transitions to the sleep mode from the user-side optical-line terminal apparatus, and
   the control device detects that the user-side optical-line terminal apparatus is in the sleep mode on a basis of the notification.

18. A control device of a user-side optical-line terminal apparatus of an optical communication system in which a common optical fiber connects a plurality of user-side optical-line terminal apparatuses to a station-side optical-line terminal apparatus, the station-side optical-line terminal apparatus suppressing an alarm in a sleep mode of the user-side optical-line terminal apparatus, the alarm being caused by a communication failure with the user-side optical-line terminal apparatus on a basis of a response signal from the user-side optical-line terminal apparatus, wherein
   the control device is capable of omitting transmission of a response signal to the station-side optical-line terminal apparatus during the sleep mode when a control signal is received from the station-side optical-line terminal apparatus via an optical transceiver during a sleep mode in which the optical transceiver connected to the optical fiber tentatively stops a transmission unit for the sleep period.

19. The control device according to claim 18, wherein the control device causes the transmission unit of the optical transceiver to wake up before the sleep period expires without omitting the response signal and starts data transmission during the sleep period.

20. The control device according to claim 18, wherein the control device outputs a notification to transition to the sleep mode with respect to the station-side optical-line terminal apparatus to the optical transceiver when the user-side optical-line terminal apparatus transitions to the sleep mode.

21. The control device according to claim 18, wherein the control device transmits the response signal to the station-side optical-line terminal apparatus via the optical transceiver when the user-side optical-line terminal apparatus returns from the sleep mode to a normal mode.

22. The control device according to claim 18, wherein the control device sets a length of the sleep period shorter than an MPCP (Multi-Point Control Protocol) timeout.

23. A control device of a station-side optical-line terminal apparatus of an optical communication system in which a common optical fiber connects a plurality of user-side optical-line terminal apparatuses to a station-side optical-line terminal apparatus, wherein
   the control device allocates a transmission bandwidth to the user-side optical-line terminal apparatus and detects an alarm for a communication failure on a basis of a presence or absence of a response signal from the user-side optical-line terminal apparatus, and suppresses the alarm during a sleep mode in which the user-side optical-line terminal apparatus tentatively stops a transmission unit of the optical transceiver.

24. The control device according to claim 23, wherein when a notification indicating that the user-side optical-line terminal apparatus transitions to the sleep mode is received via the optical transceiver, the control device detects that the user-side optical-line terminal apparatus is in the sleep mode on a basis of the notification.

25. The control device according to claim 23, wherein the control device maintains a communication link with the user-side optical-line terminal apparatus with respect to which the alarm is suppressed and which is transitioned to the sleep mode.

26. The control device according to claim 23, wherein the control device detects a Loss of Signal with respect to each of the user-side optical-line terminal apparatuses as the alarm and masks an alarm of a Loss of Signal during the sleep period with respect to a user-side optical-line terminal apparatus in the sleep mode.

* * * * *